US012446785B2

(12) United States Patent
Sano et al.

(10) Patent No.: US 12,446,785 B2
(45) Date of Patent: Oct. 21, 2025

(54) BLOOD PRESSURE MEASUREMENT DEVICE

(71) Applicants: OMRON Corporation, Kyoto (JP); OMRON HEALTHCARE Co., Ltd., Kyoto (JP)

(72) Inventors: Yoshihiko Sano, Kyoto (JP); Takashi Ono, Kyoto (JP); Masaki Harada, Kyoto (JP); Takanori Nishioka, Kyoto (JP)

(73) Assignees: OMRON CORPORATION, Kyoto (JP); OMRON HEALTHCARE CO., LTD., Kyoto (JP)

( * ) Notice: Subject to any disclaimer, the term of this patent is extended or adjusted under 35 U.S.C. 154(b) by 947 days.

(21) Appl. No.: 17/304,507

(22) Filed: Jun. 22, 2021

(65) Prior Publication Data

US 2021/0307630 A1  Oct. 7, 2021

Related U.S. Application Data

(63) Continuation of application No. PCT/JP2019/048036, filed on Dec. 9, 2019.

(30) Foreign Application Priority Data

Dec. 27, 2018  (JP) ................. 2018-246166

(51) Int. Cl.
*A61B 5/00* (2006.01)
*A61B 5/022* (2006.01)

(52) U.S. Cl.
CPC .......... *A61B 5/02233* (2013.01); *A61B 5/681* (2013.01); *A61B 2562/0247* (2013.01)

(58) Field of Classification Search
CPC .............. A61B 5/02233; A61B 5/681; A61B 2562/0247; A61B 5/02141; A61B 5/002; A61B 5/025; A61B 5/7455
See application file for complete search history.

(56) References Cited

U.S. PATENT DOCUMENTS 6,336,901 B1 * 1/2002 Itonaga ............... A61B 5/681
                                                   600/499
2003/0088267 A1 * 5/2003 Itonaga ............ A61B 5/02233
                                                   606/202

(Continued)

FOREIGN PATENT DOCUMENTS

JP   2007-175185 A   7/2007
JP   2008-168054 A   7/2008

(Continued)

OTHER PUBLICATIONS

International Preliminary Report on Patentability and Written Opinion of the International Searching Authority issued Jul. 8, 2021 in International (PCT) Application No. PCT/JP2019/048036.

*Primary Examiner* — Alex M Valvis
*Assistant Examiner* — Grace L Rozanski
(74) *Attorney, Agent, or Firm* — Wenderoth, Lind & Ponack, L.L.P.

(57) ABSTRACT

A blood pressure measurement device includes a device main body, a curler, and a sensing cuff. The curler curves following a circumferential direction of a wrist from a hand back side of the wrist to a region where at least an artery is present on a hand palm side of the wrist. The curler includes a cover portion that fixes the device main body to the hand back side of the wrist. The curler has a curvature of an end portion on a short-hand side from the cover portion set smaller than a curvature of an end portion on a long-hand side from the device main body. The end portion on the short-hand side is separated from the end portion on the long-hand side. The sensing cuff is provided on the long-hand side of the curler and an inner circumferential surface on the hand palm side of the wrist.

5 Claims, 26 Drawing Sheets

(56) References Cited

U.S. PATENT DOCUMENTS

| | | | |
|---|---|---|---|
| 2005/0283084 A1* | 12/2005 | Kato | A61B 5/02233 |
| | | | 600/499 |
| 2006/0079792 A1 | 4/2006 | Finburgh | |
| 2016/0066859 A1* | 3/2016 | Crawford | A61B 5/681 |
| | | | 600/595 |
| 2021/0307629 A1* | 10/2021 | Nishioka | A61B 5/6838 |

FOREIGN PATENT DOCUMENTS

| | | |
|---|---|---|
| JP | 2018-143557 A | 9/2018 |
| JP | 1615126 S | 10/2018 |

* cited by examiner

[FIG. 1]
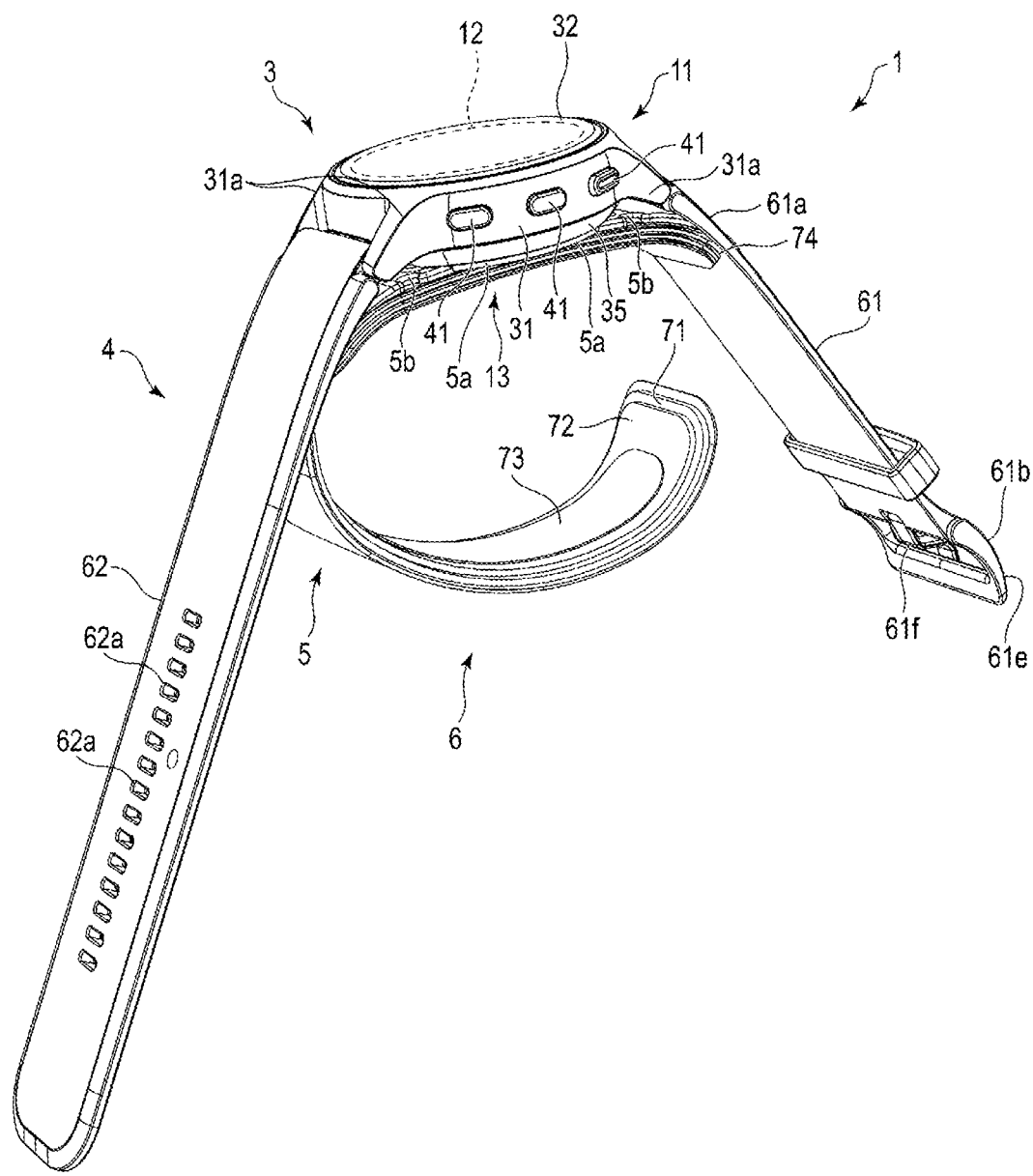

[FIG. 2]
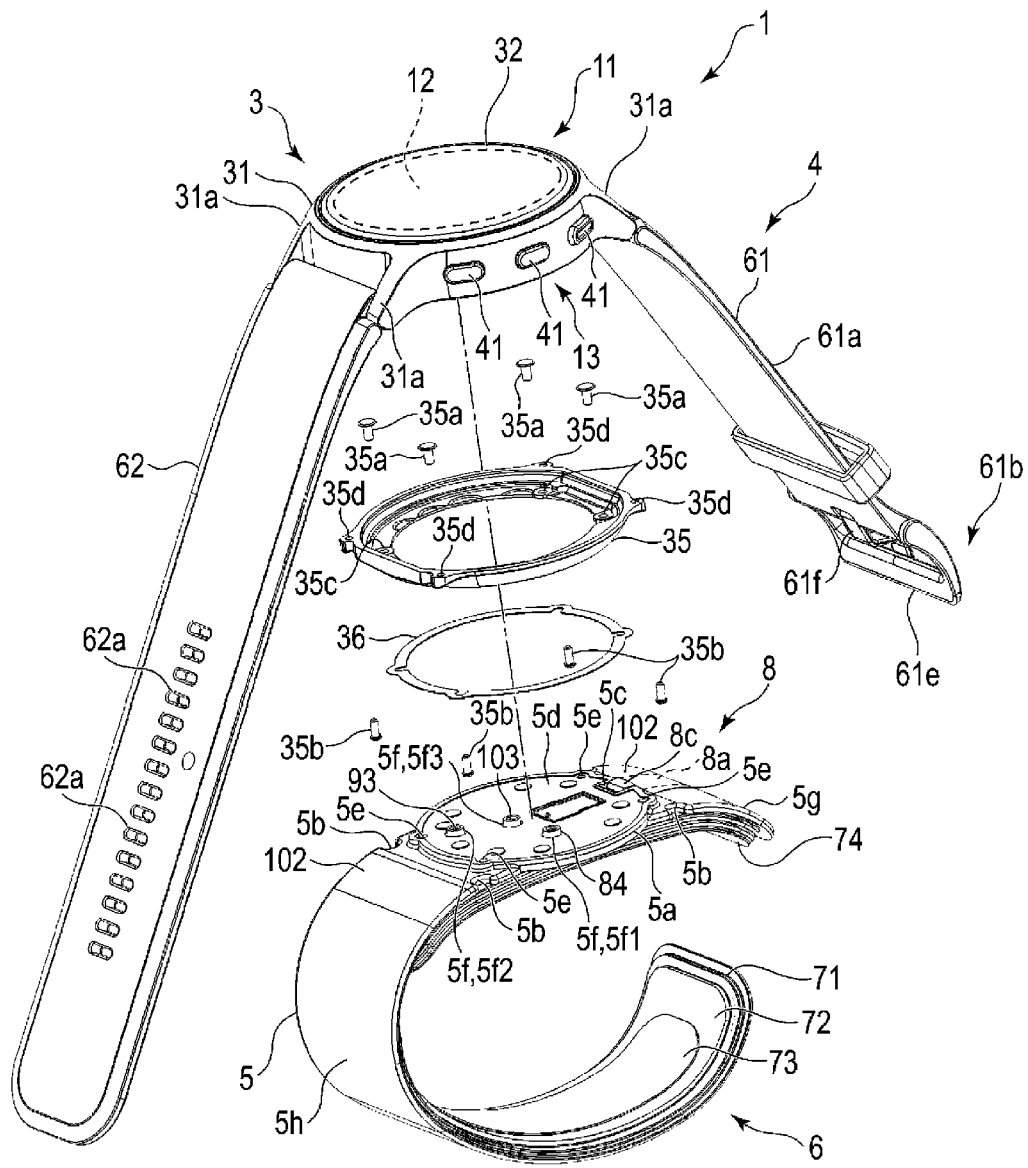

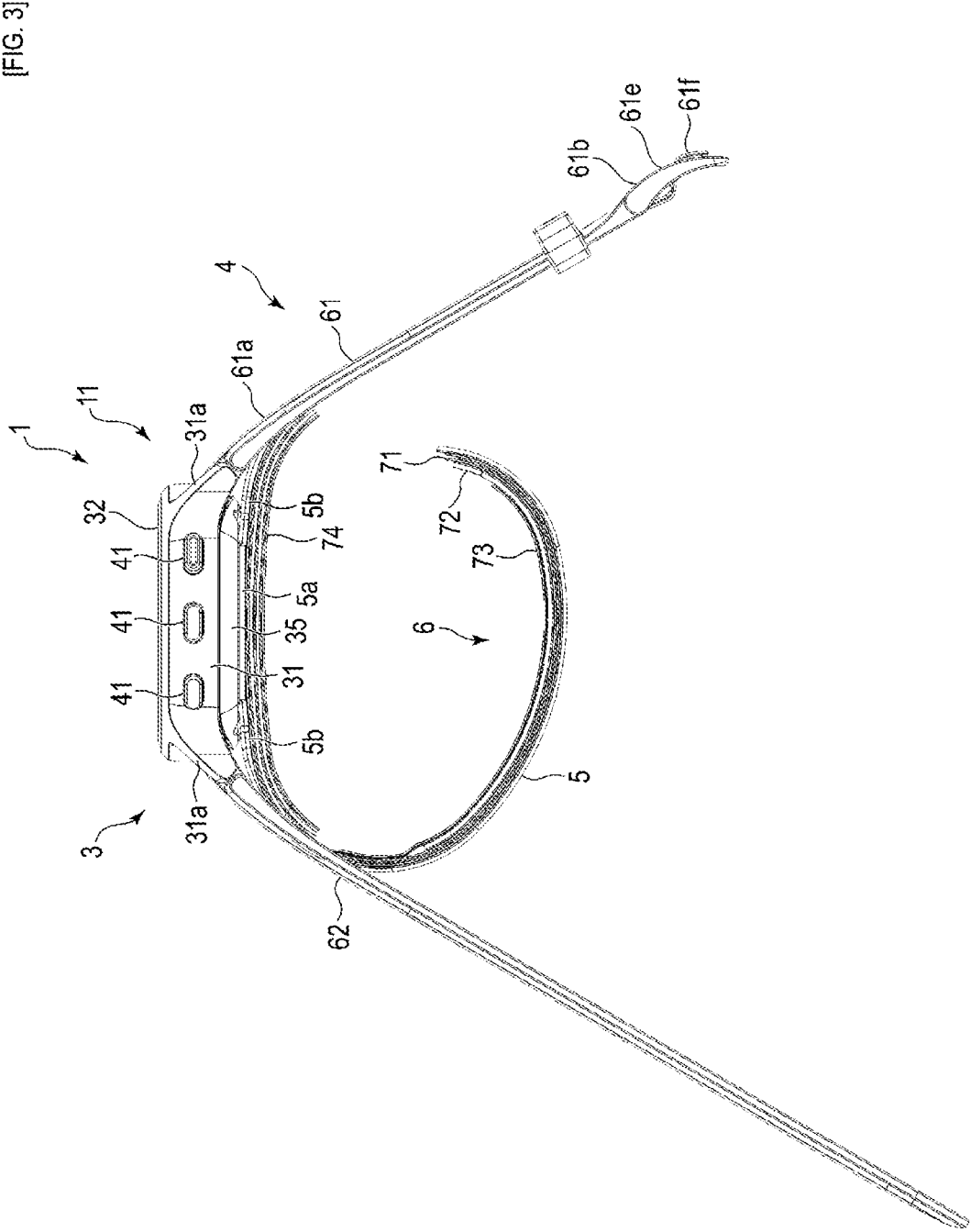

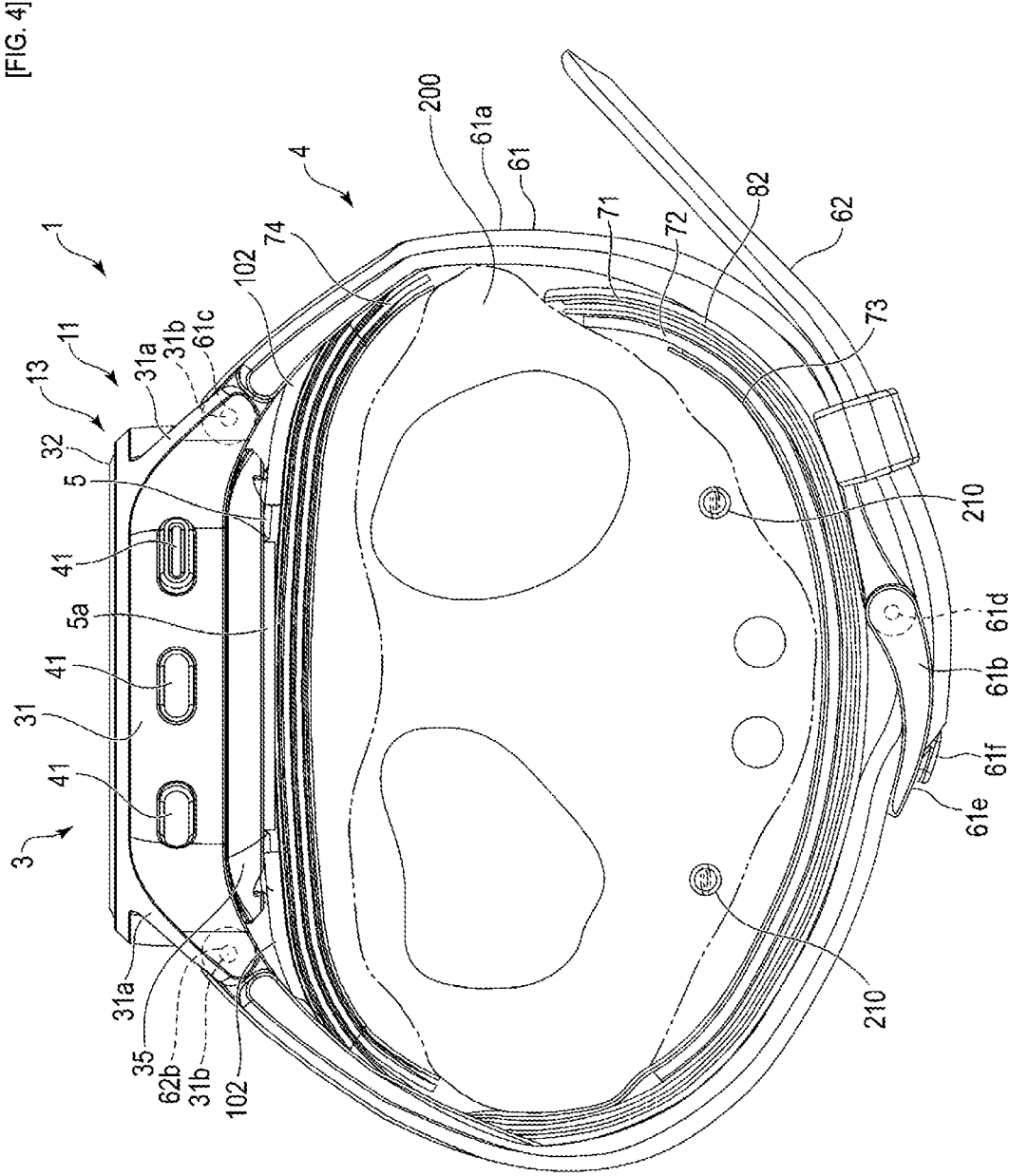
[FIG. 4]

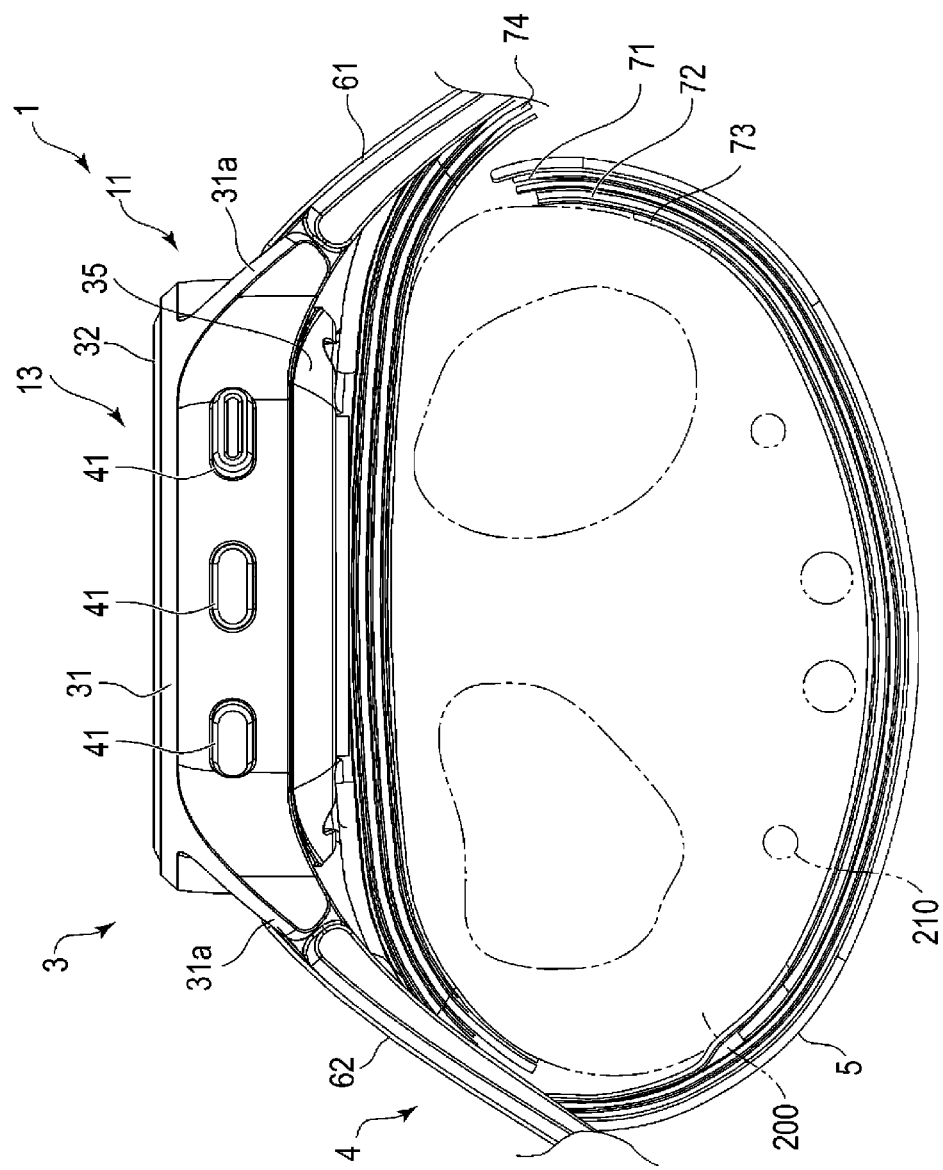
[FIG. 5]

[FIG. 6]
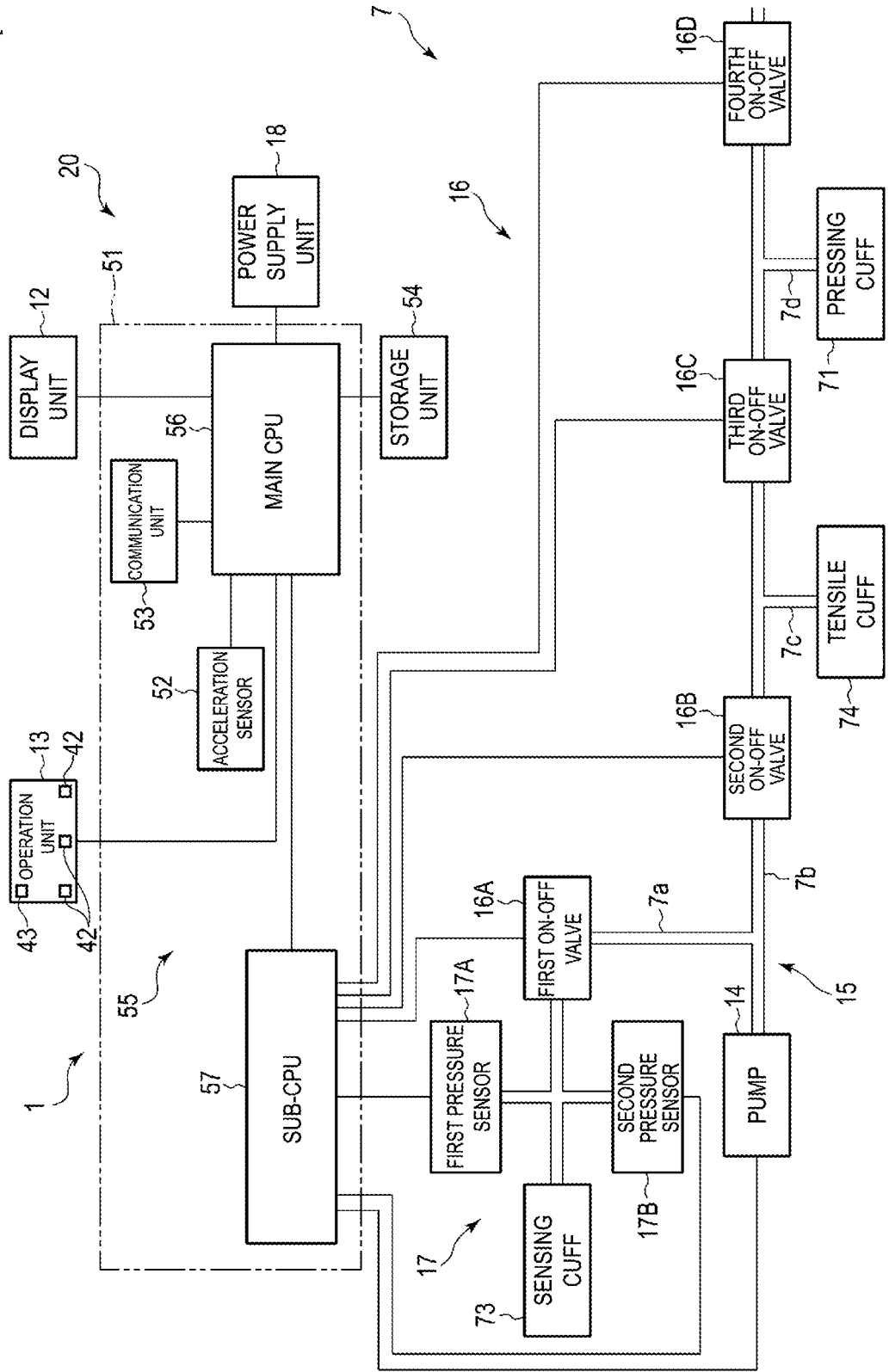

[FIG. 7]
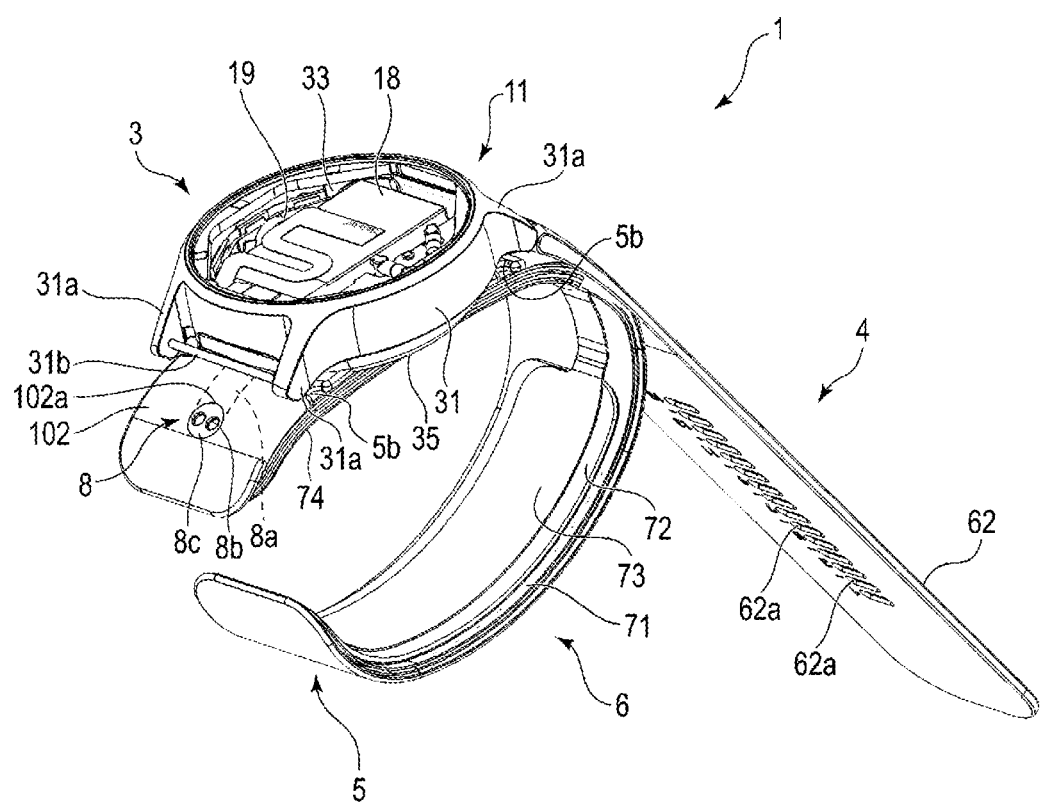

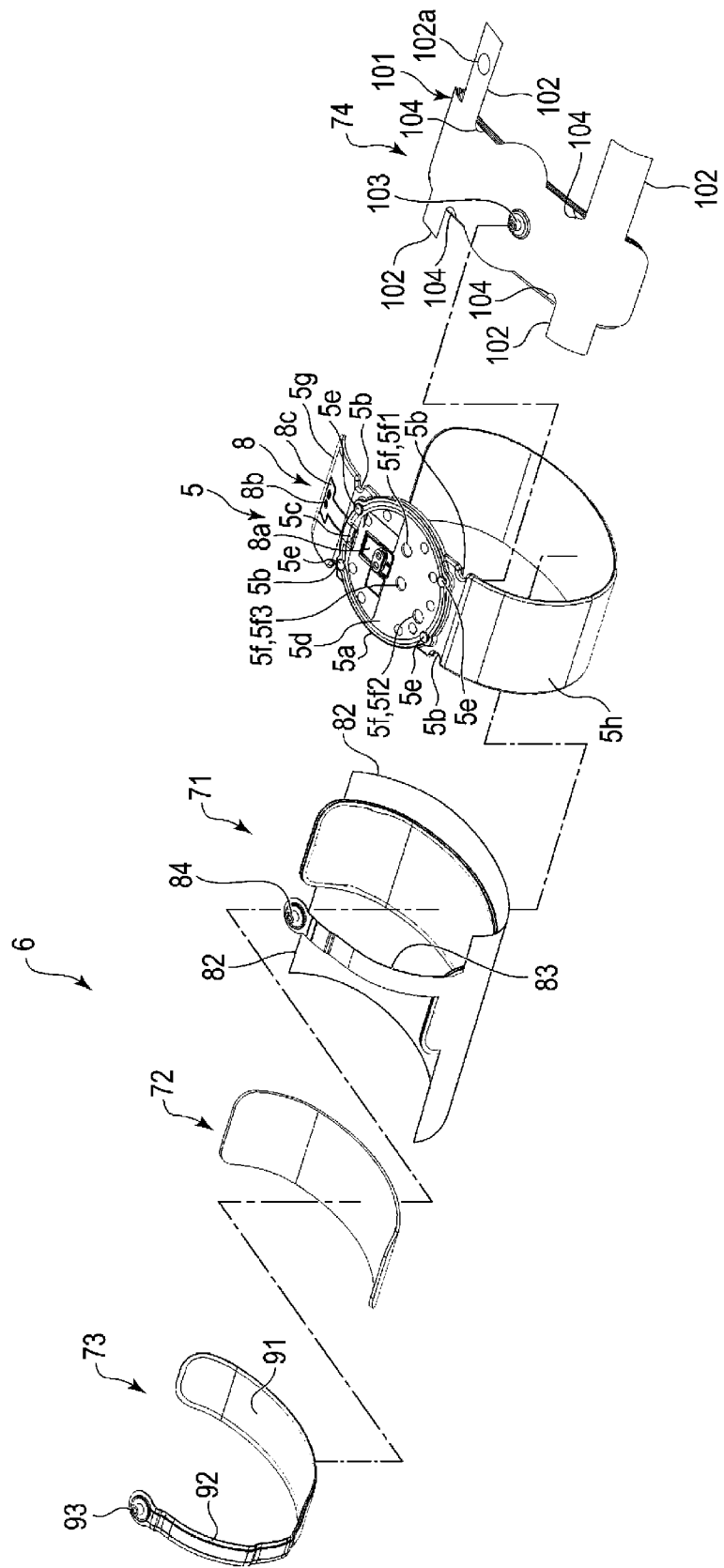
[FIG. 8]

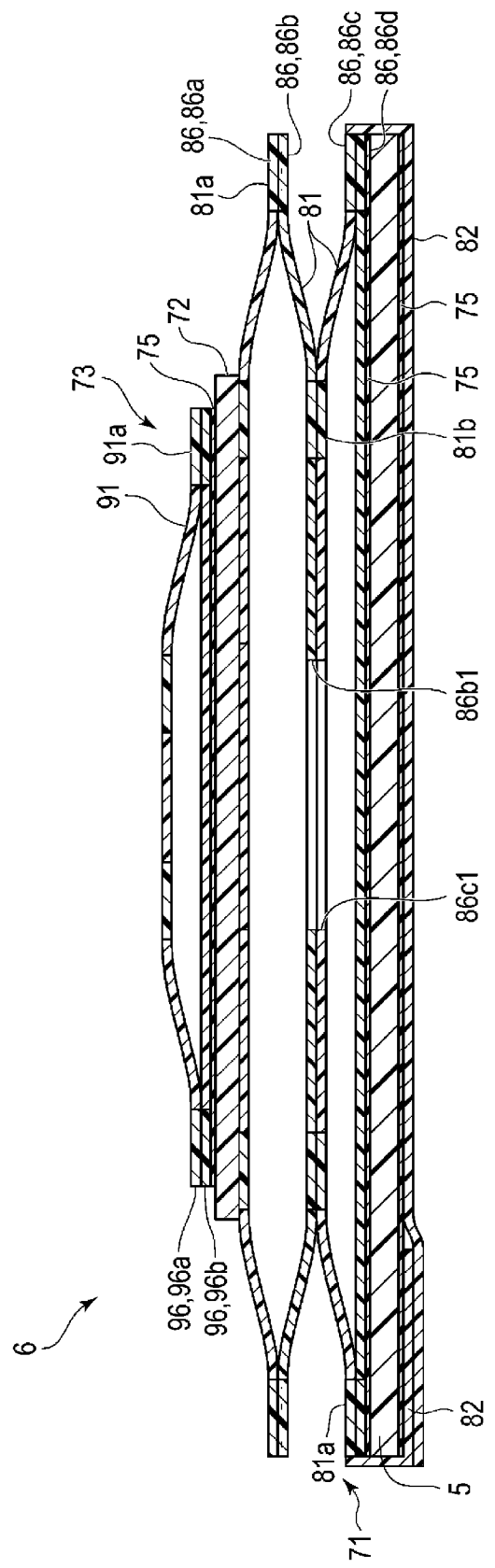
[FIG. 9]

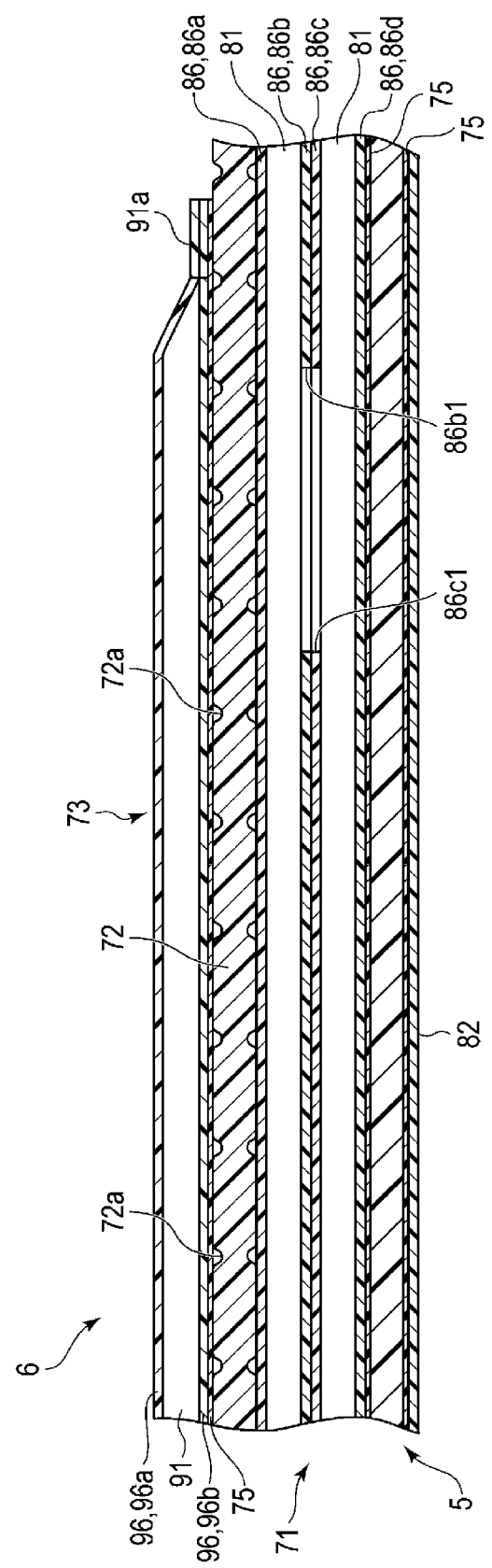
[FIG. 10]

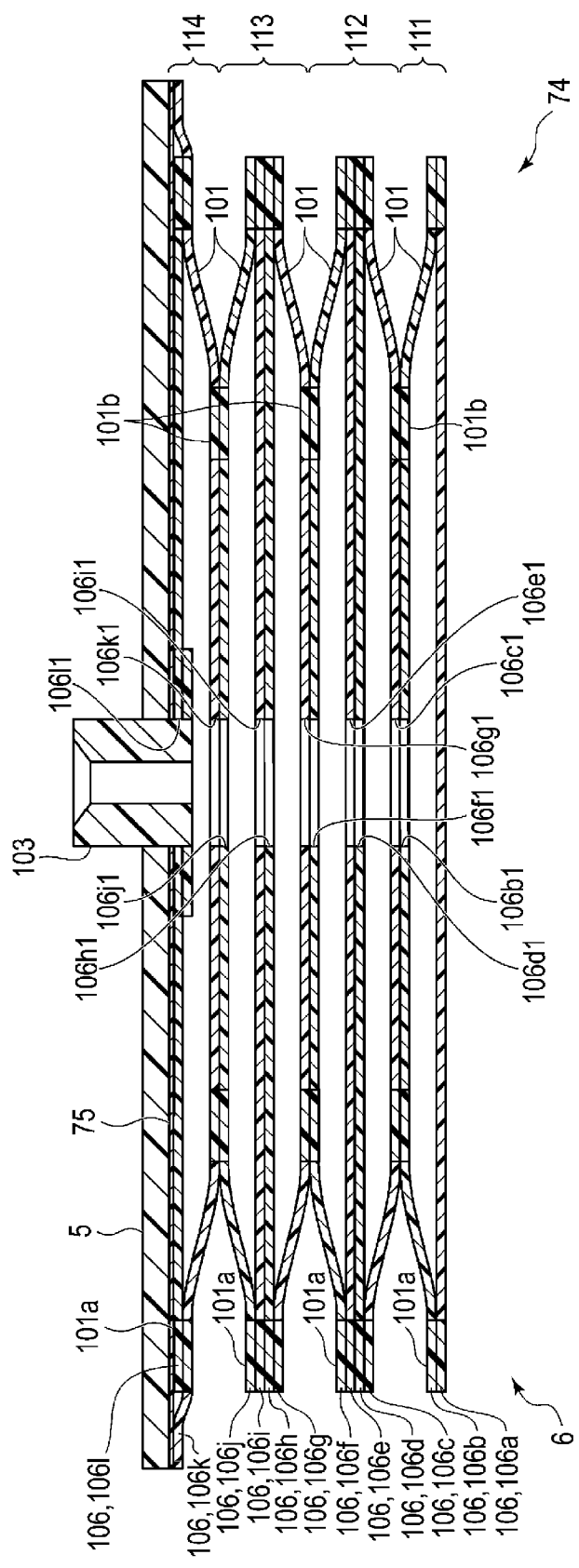

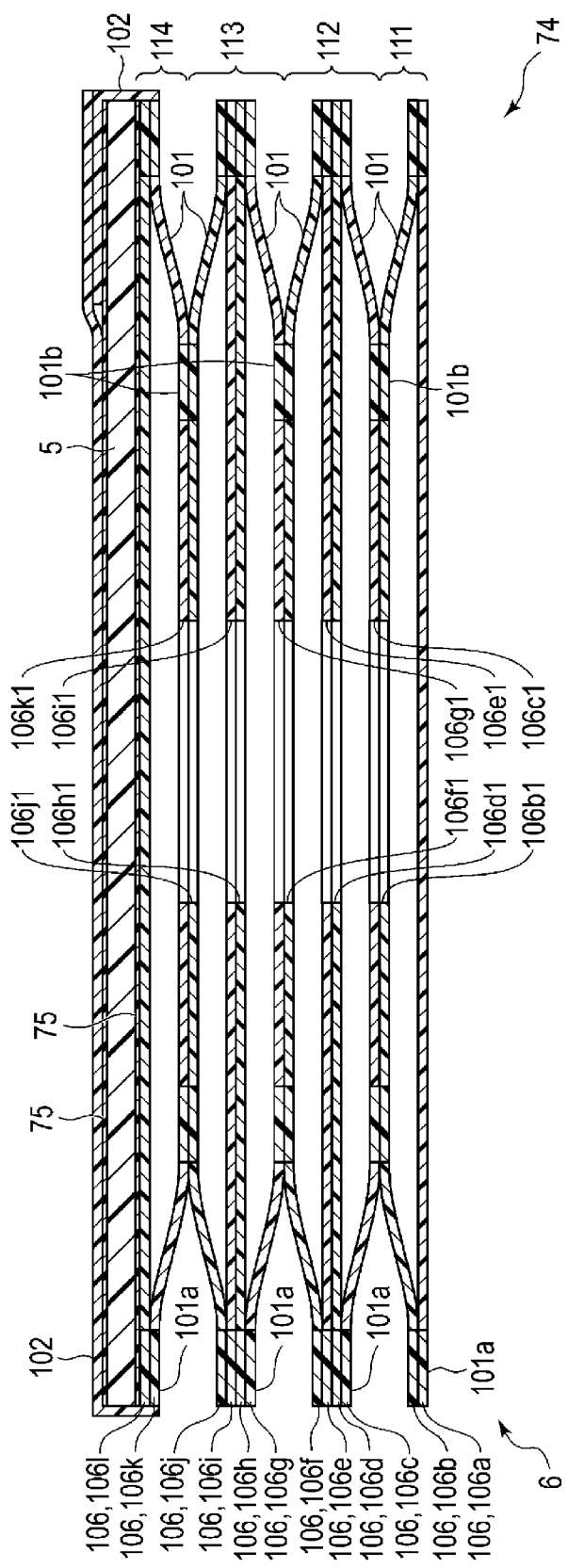

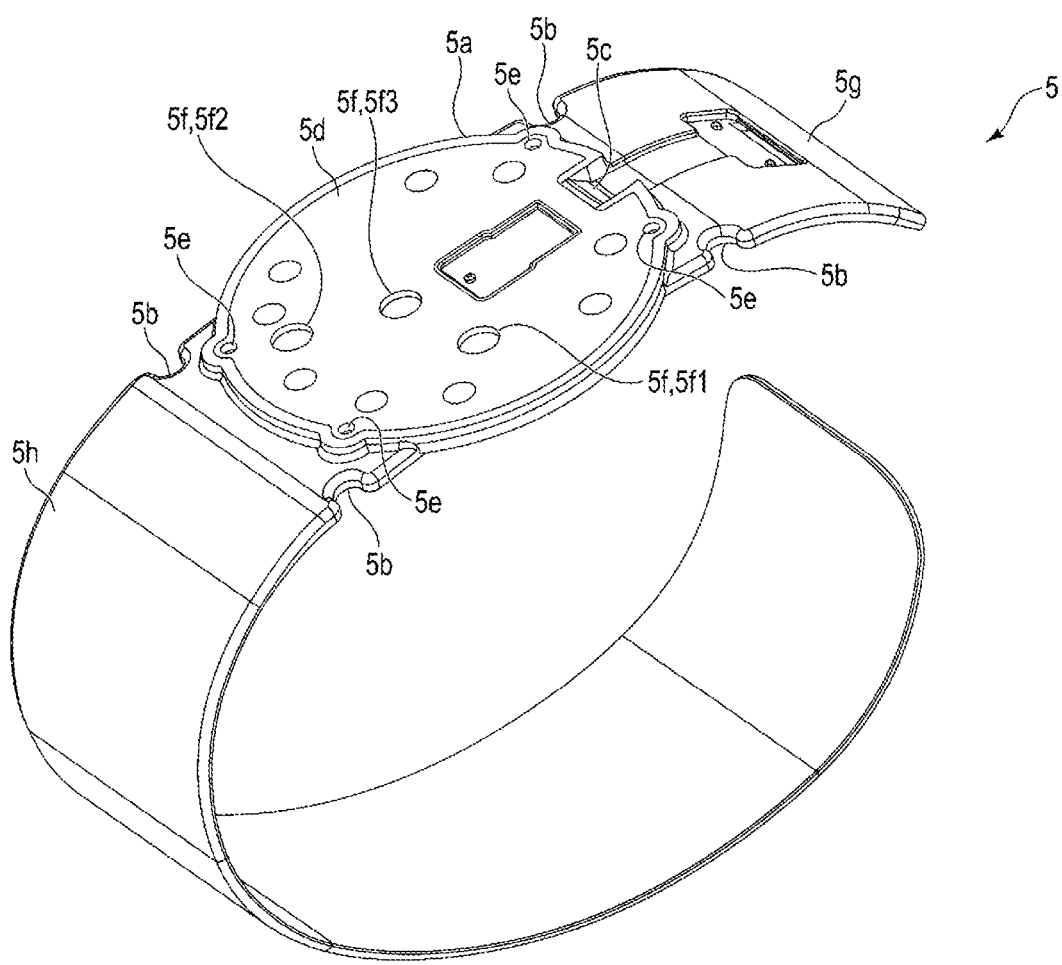
[FIG. 13]

[FIG. 14]
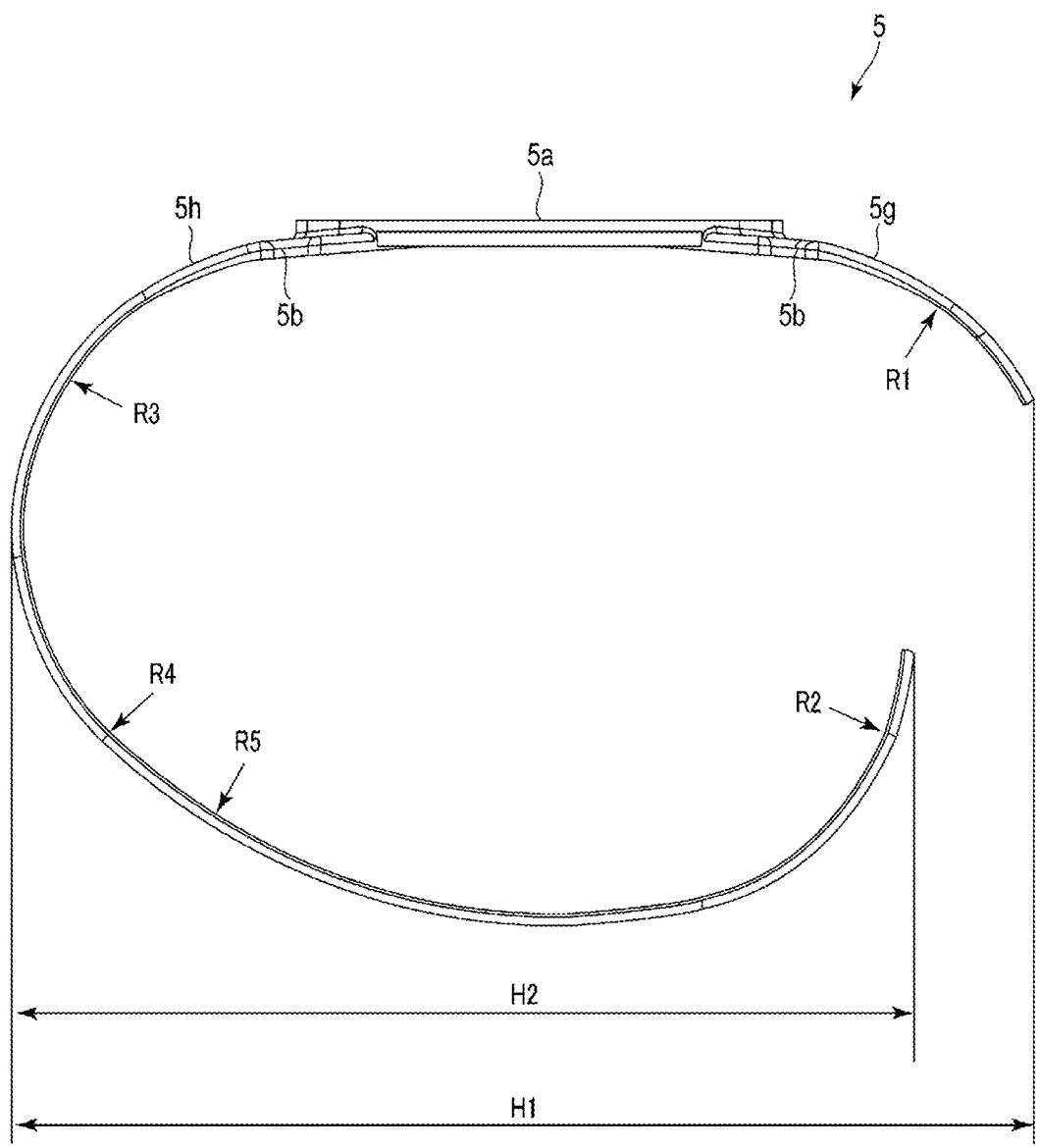

[FIG. 15]
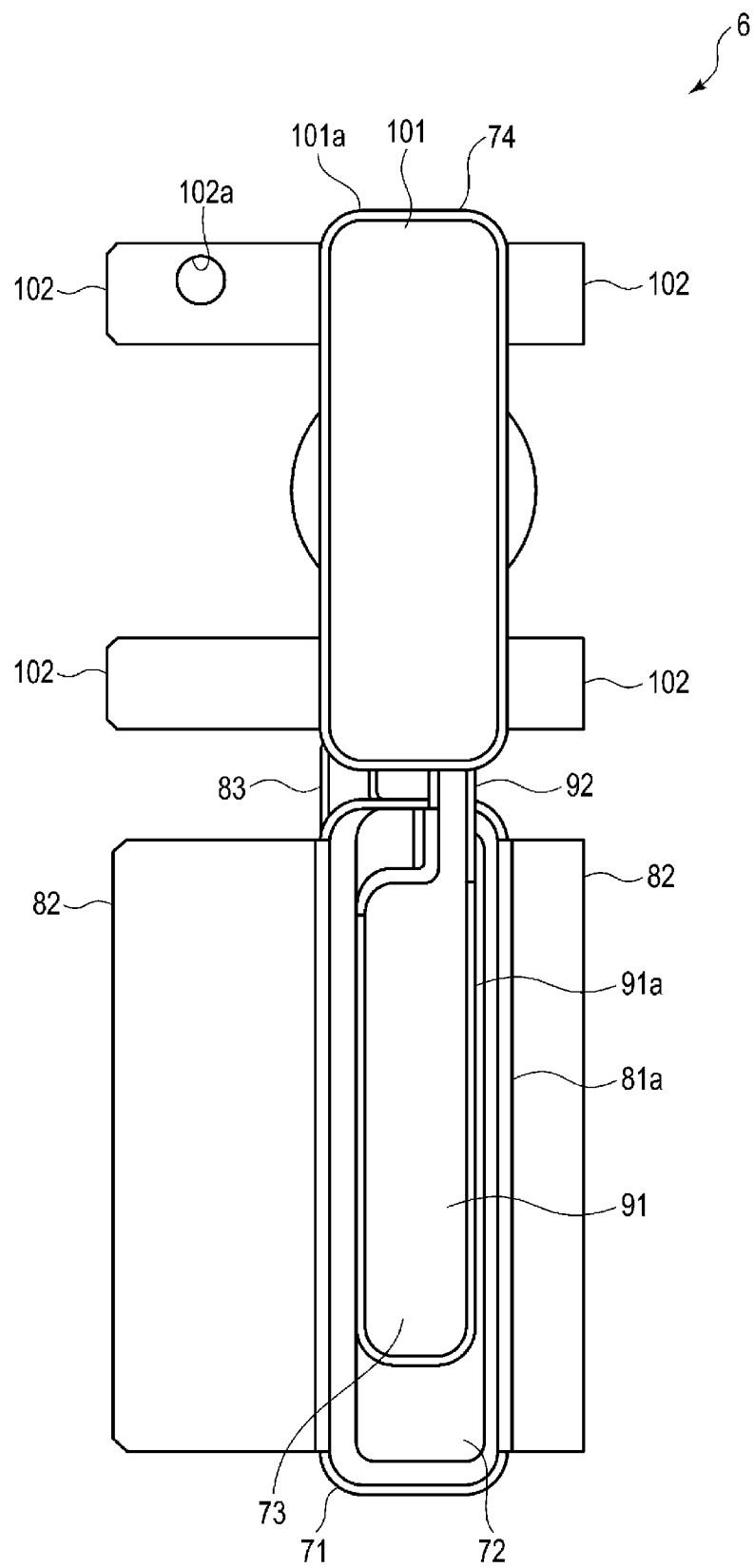

[FIG. 16]
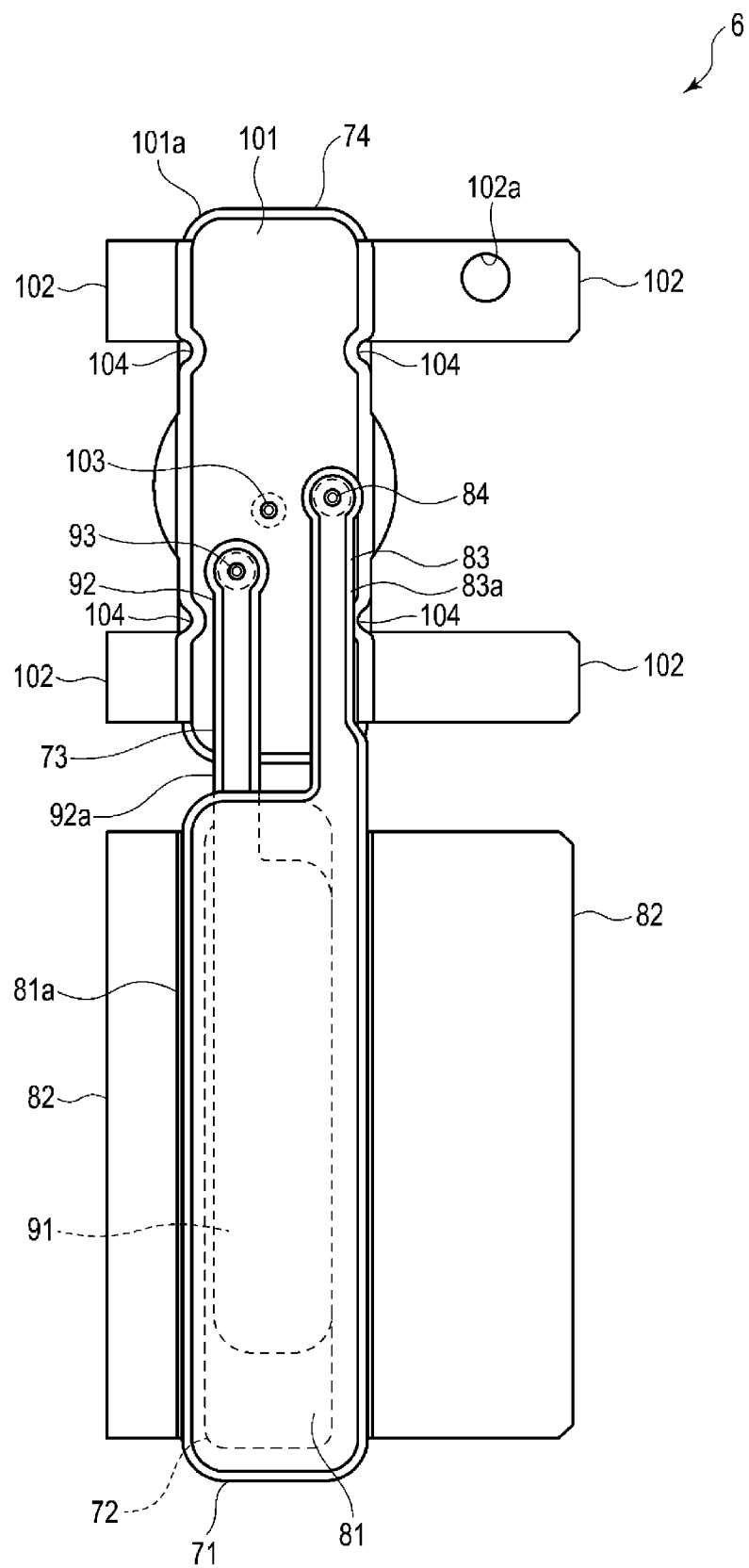

[FIG. 17]
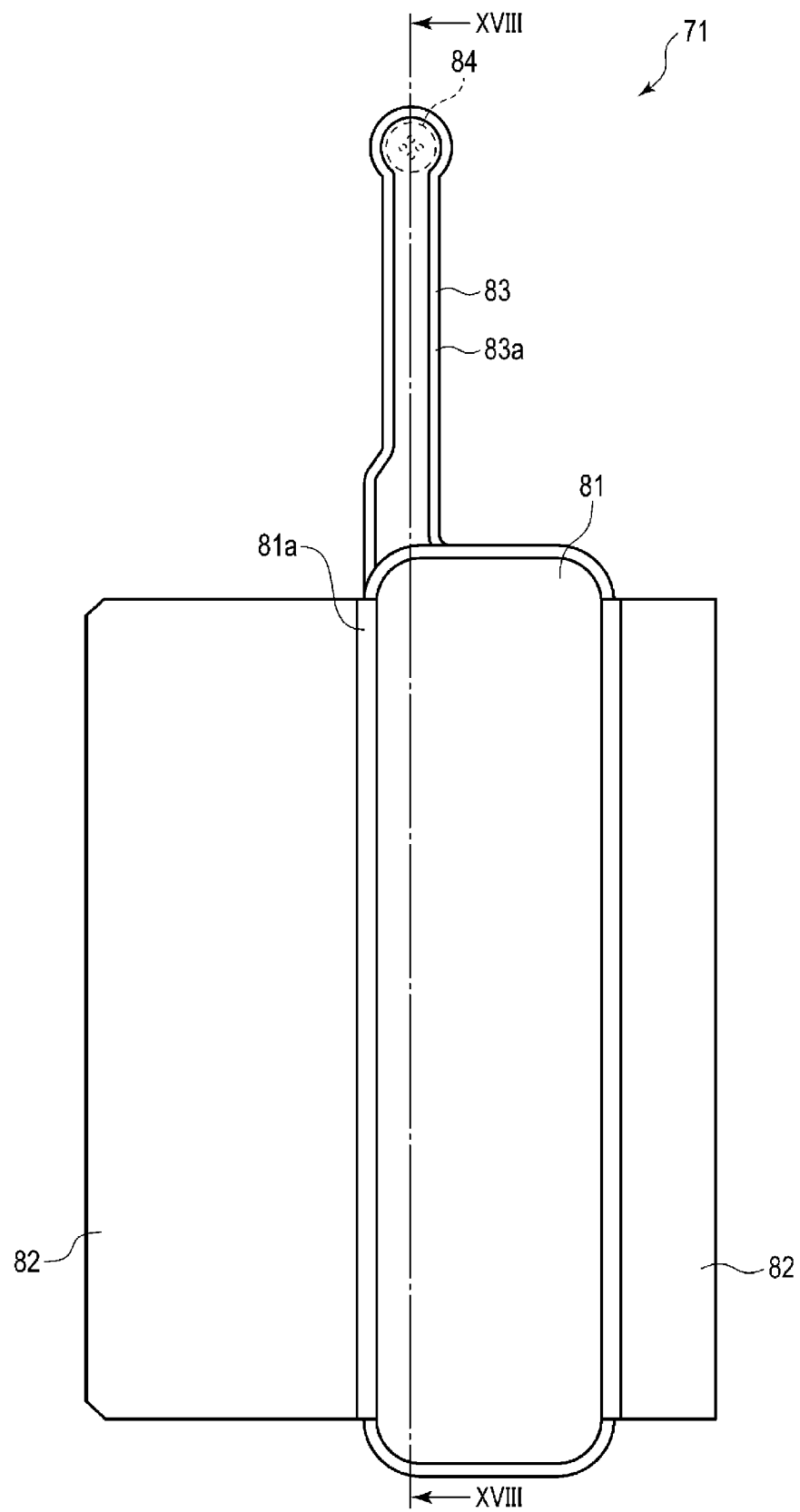

[FIG. 18]
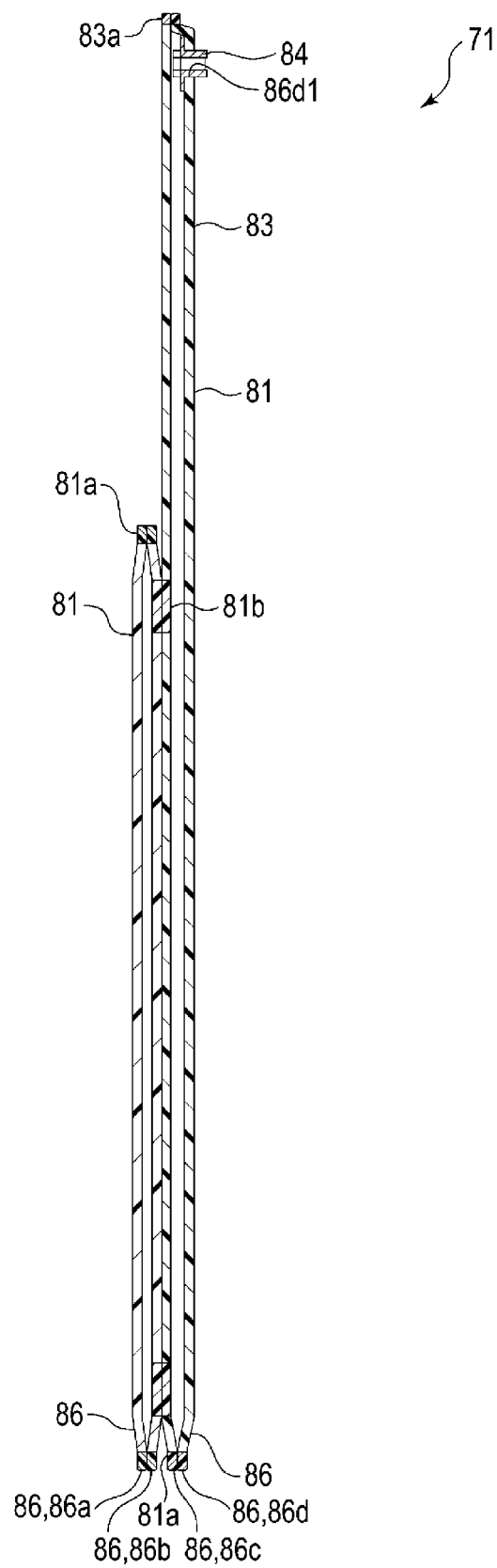

[FIG. 19]
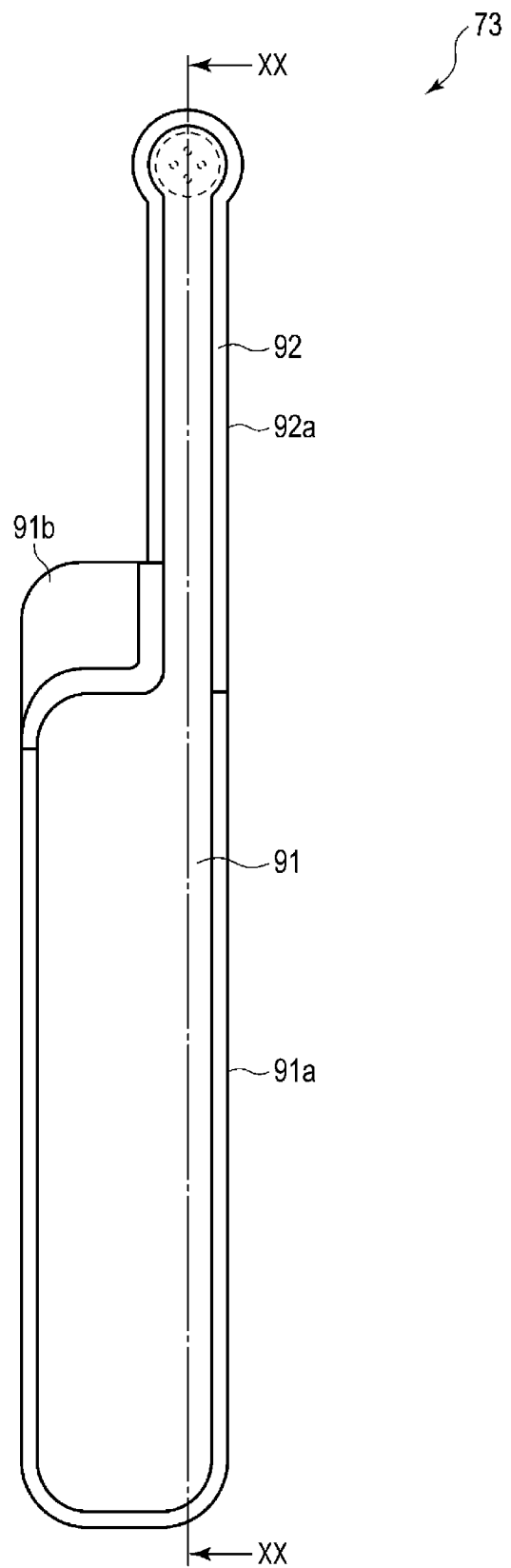

[FIG. 20]
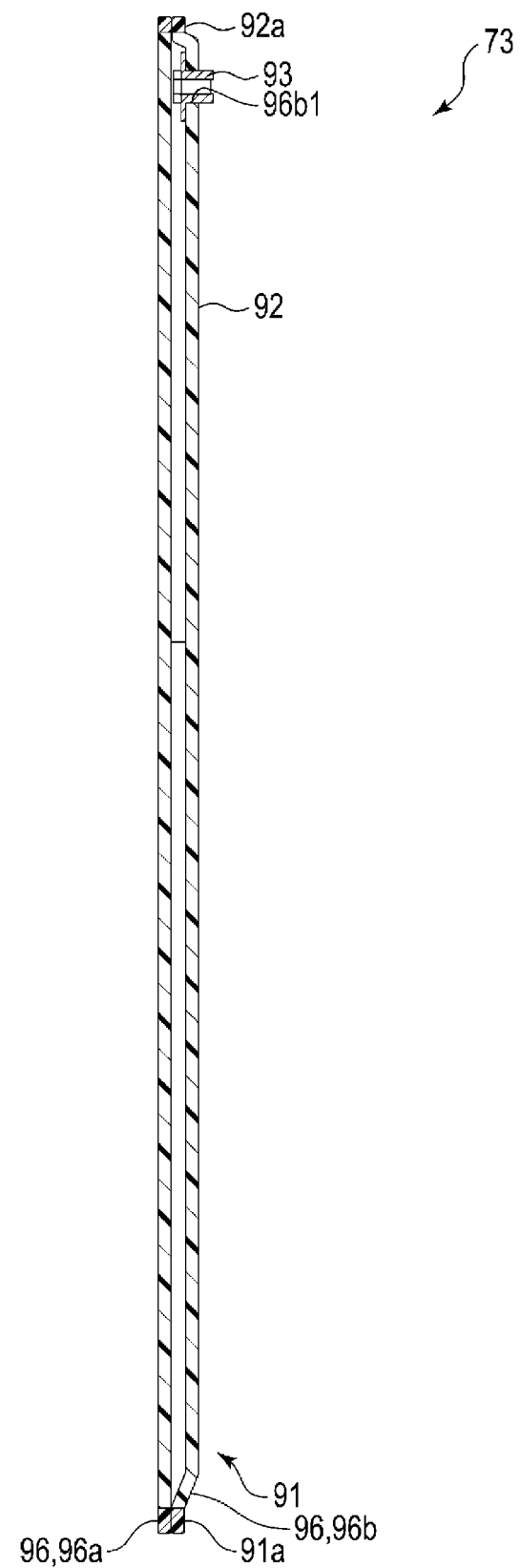

[FIG. 21]
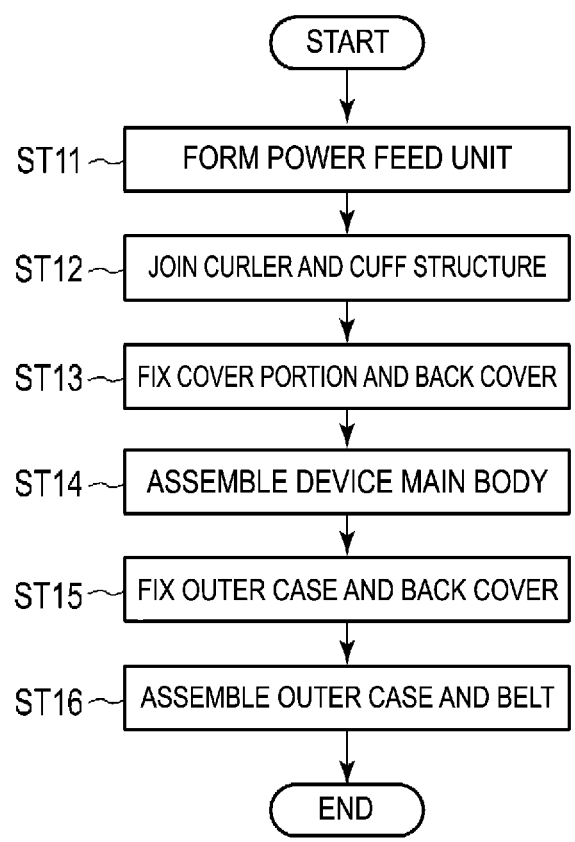

[FIG. 22]
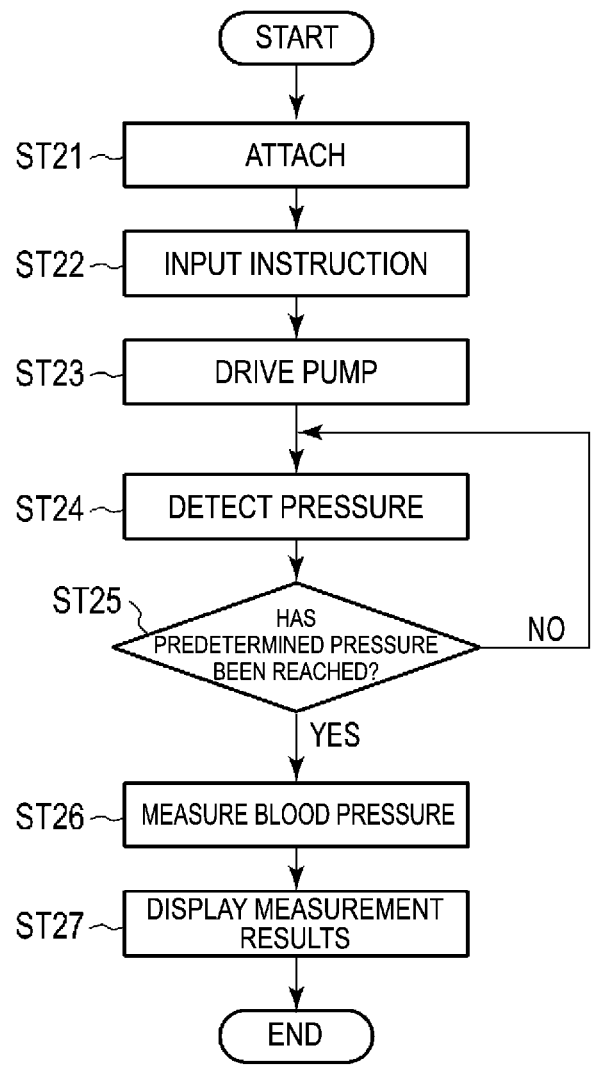

[FIG. 23]
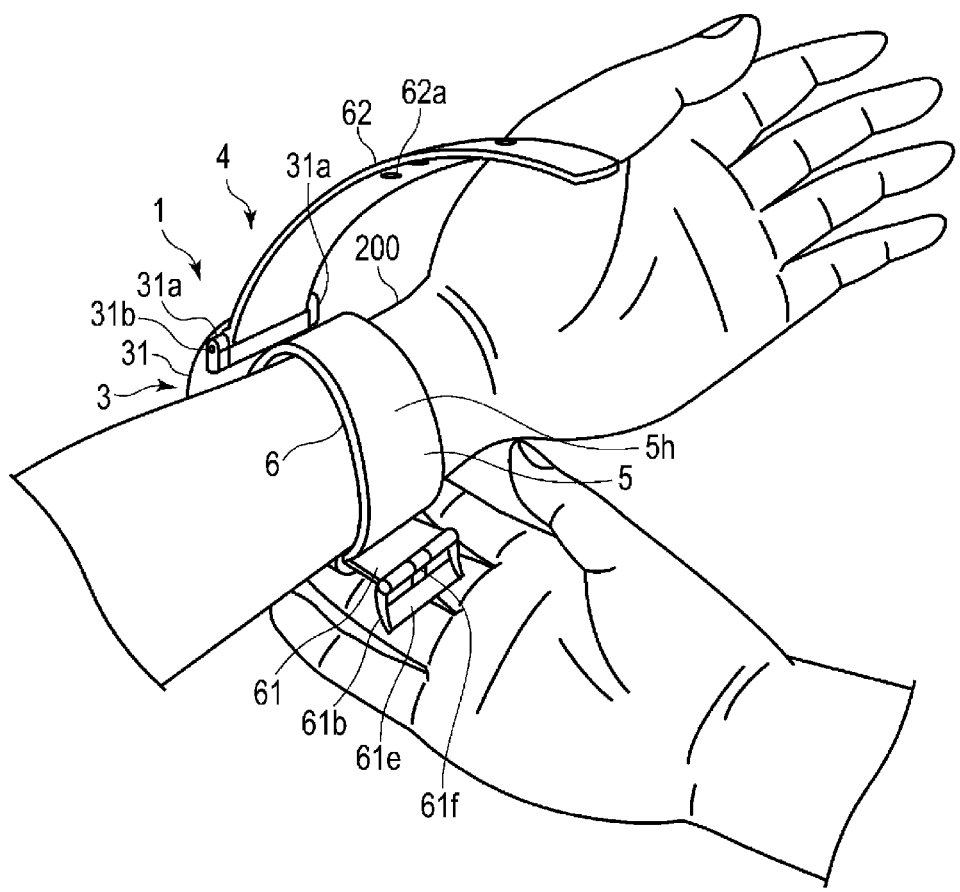

[FIG. 24]
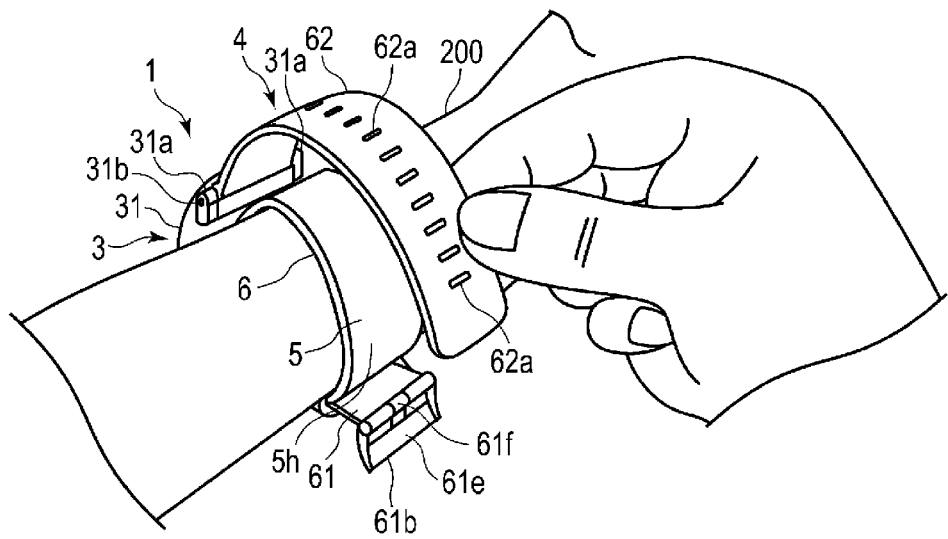
[FIG. 25]
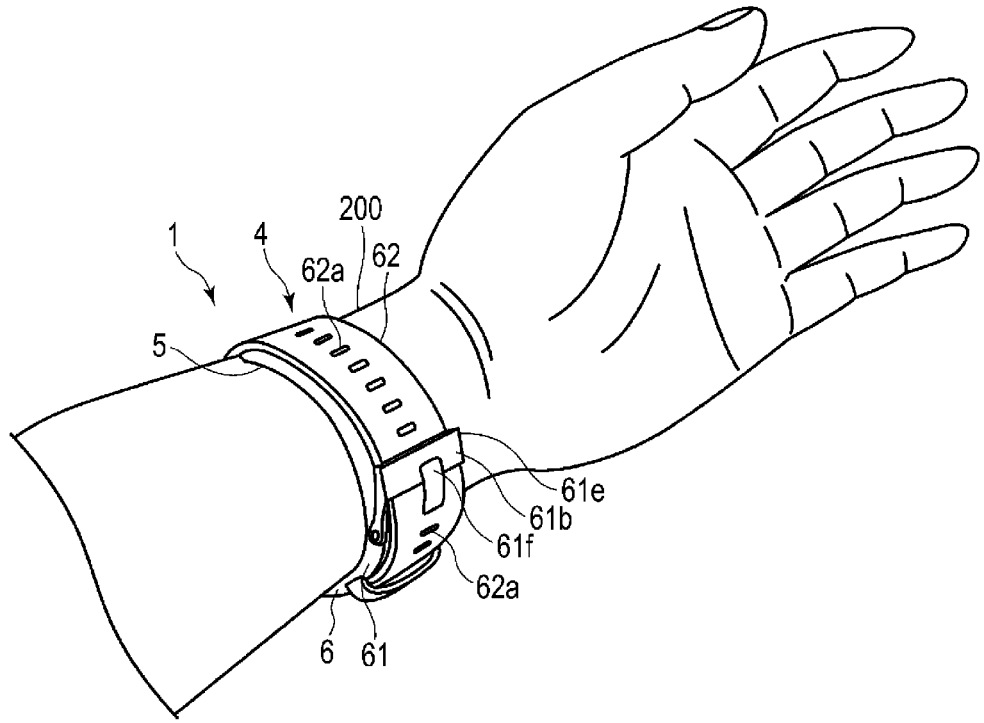

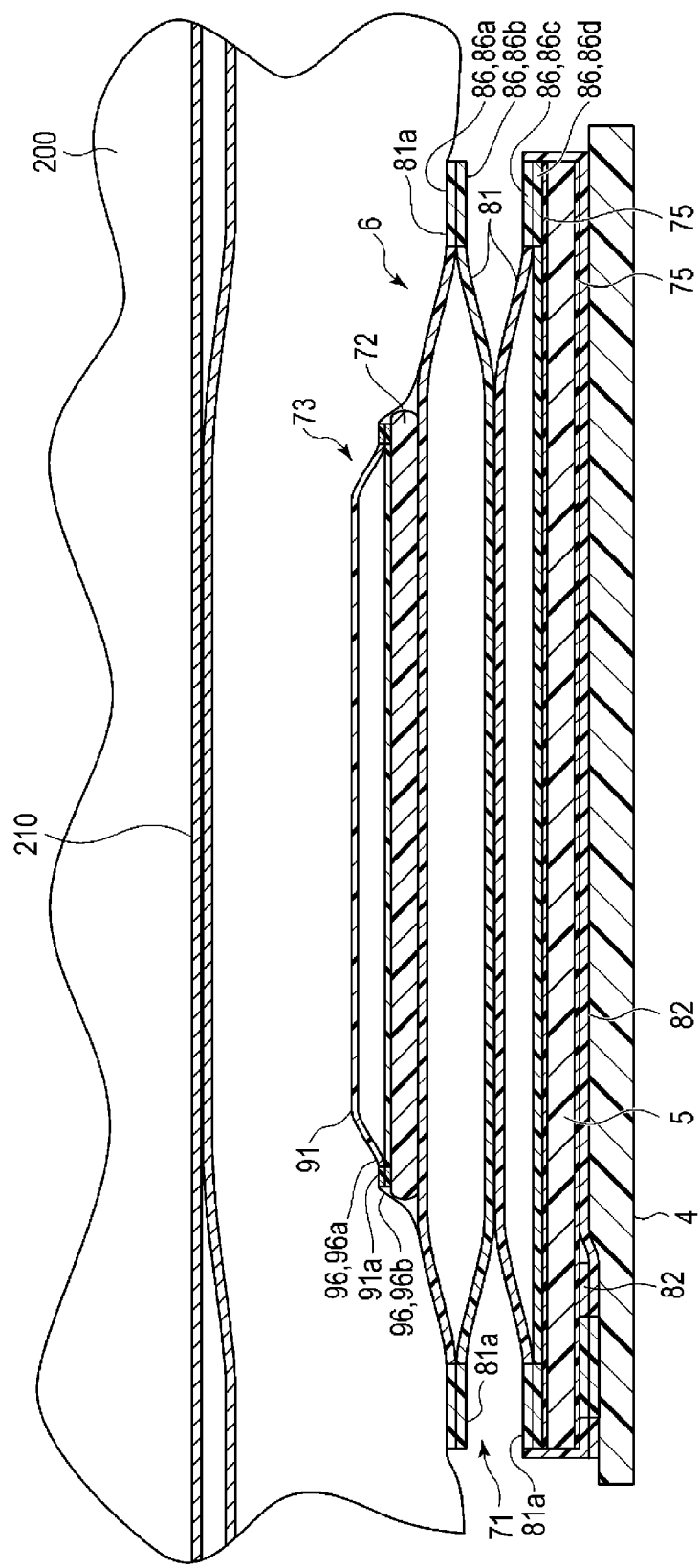
[FIG. 26]

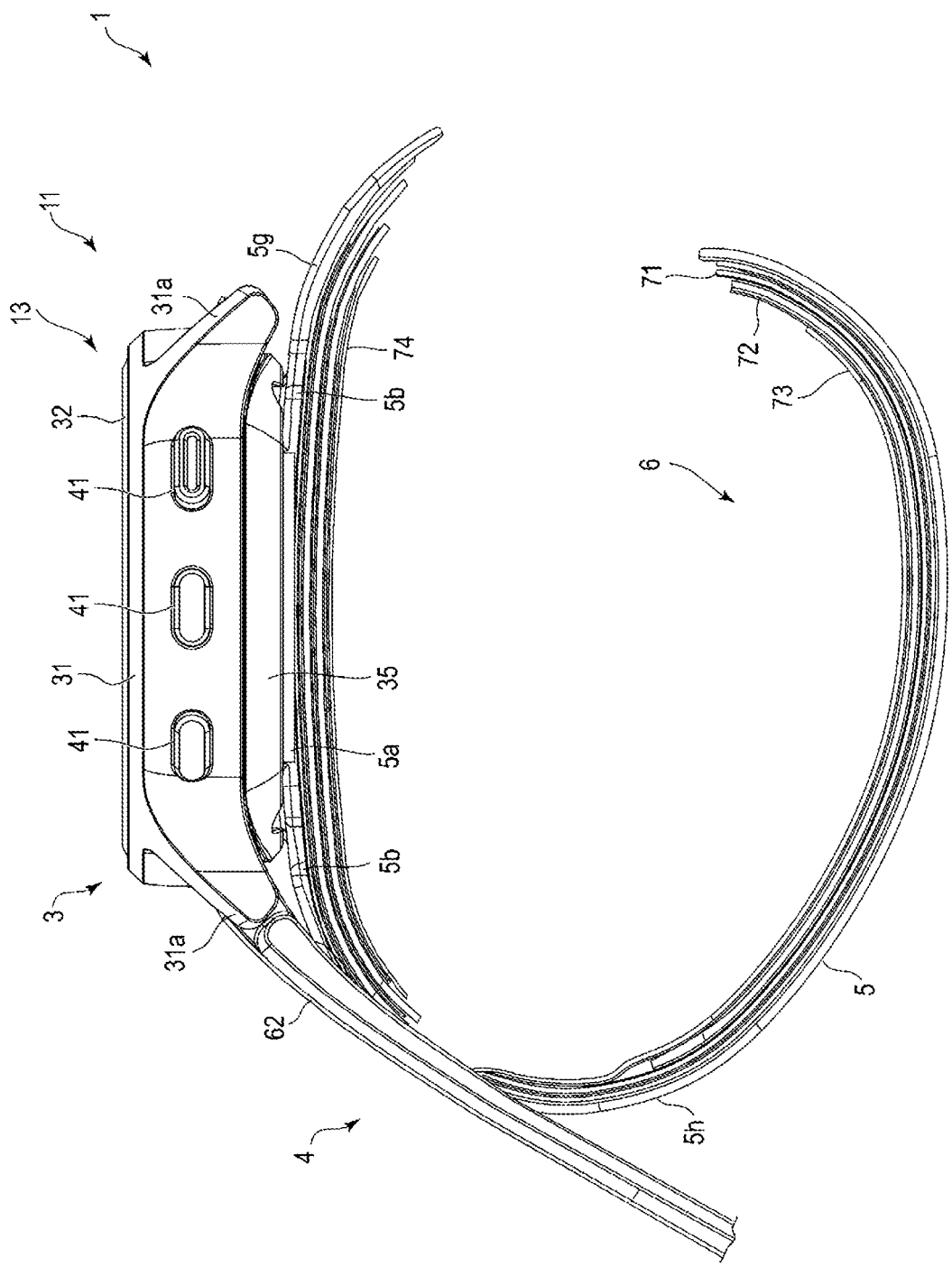

BLOOD PRESSURE MEASUREMENT DEVICE

CROSS-REFERENCE TO RELATED APPLICATIONS

This application is the U.S. national stage application filed pursuant to 35 U.S.C. 365(c) and 120 as a continuation of International Patent Application No. PCT/JP2019/048036, filed Dec. 9, 2019, which application claims priority to Japan Patent Application No. 2018-246166, filed Dec. 27, 2018, which applications are incorporated herein by reference in their entireties.

TECHNICAL FIELD

The present invention relates to a blood pressure measurement device for measuring blood pressure.

BACKGROUND ART

In recent years, blood pressure measurement devices for measuring blood pressure are being used to monitor health status at home, as well as in medical facilities. A blood pressure measurement device detects vibration of the artery wall to measure blood pressure by, for example, inflating and contracting a cuff wrapped around the upper arm or the wrist of a living body and detecting the pressure of the cuff using a pressure sensor.

A blood pressure measurement device referred to as, for example, a so-called integral type in which a cuff is integrated with a device main body supplying a fluid to the cuff has been known. The blood pressure measurement devices have a problem that when, for example, creases and folds occur in the cuff, accuracy of measured blood pressure measurement results decreases. Additionally, in the blood pressure measurement device, the cuff is required to inflate in an occlusion direction of a blood vessel such that the cuff is brought into close contact with a wrist during the inflation.

Therefore, for example, as disclosed in JP 2007-175185 A, a blood pressure measurement device using a curler to bring an inflated cuff into close contact with a wrist has also been known (see, for example, Patent Document 1). Such a blood pressure measurement device includes the cuff and the curler in a bag-like cover body, and uses the bag-like cover body as a fixture for fixation to the wrist. After the cuff is brought into close contact with a living body by the bag-like cover body and the curler, the curler is inflated to suitably occlude a blood vessel during the inflation of the cuff.

CITATION LIST

Patent Literature

Patent Document 1: JP 2007-175185 A

SUMMARY OF INVENTION

Technical Problem

Since the above-described curler of the blood pressure measurement device is formed in a shape covering the wrist, it is necessary to expand the curler from an initial position and insert the wrist into the curler, and it is necessary to expand the curler during attachment. Therefore, to attach the blood pressure measurement device to a comparatively thick wrist, since an amount of deformation of the curler increases, a load is possibly applied to the curler. Furthermore, when the curler is deformed and attached, the wrist is possibly compressed by the curler due to a restoring force of the curler. In particular, as the blood pressure measurement device, a wearable device attached to the wrist at all times has recently been considered. When the wrist is compressed by the curler while the wearable device is attached to the wrist at all times, a load is applied to the wrist. Therefore, attaching the blood pressure measurement device at all times possibly places a burden on a user.

For example, it is conceivable to set the initial position of the curler according to the comparatively thick wrist. However, when the curler is attached to a comparatively slim wrist, an amount of deformation in a direction of narrowing the curler increases. As a result, end portions of the curler interfere with each other, possibly generating a gap between the curler and the wrist. Presence of the gap between the curler and the wrist fails to bring the cuff into close contact with the wrist during the attachment of the blood pressure measurement device, possibly failing to suitably compress the wrist by the cuff. In particular, with the use of the wearable device, satisfactory blood pressure measurement accuracy is required for the blood pressure measurement device even after miniaturization, and therefore there is a demand for a technique in which the cuff can be brought into close contact with the wrist to compress the wrist.

Furthermore, in the case where the wearable device is used as the blood pressure measurement device, from aspects of downsizing and designability, the use of a belt constituted by, for example, a parent and a blade tip similarly to a wristwatch as a fixture to fix the curler and the cuff to the wrist has also been considered. In the case where the belt is used, since the belt and the curler are separate bodies, it is necessary to directly expand the curler when the blood pressure measurement device is attached. Therefore, there is a demand for a curler that can improve wearability.

Therefore, an object of the present invention is to provide a blood pressure measurement device that allows improving wearability and allows suitably bringing a cuff into close contact with a wrist.

Solution to Problem

According to one aspect, there is provided a blood pressure measurement device attached to a wrist. The blood pressure measurement device includes a device main body, a curler, and a sensing cuff. The device main body stores a pump and a pressure sensor. The curler curves following a circumferential direction of the wrist from a hand back side of the wrist to a region where at least an artery is present on a hand palm side of the wrist through a first lateral side of the wrist. The curler includes a cover portion that fixes the device main body to the hand back side of the wrist. The curler has a curvature of an end portion on a short-hand side from the cover portion set smaller than a curvature of an end portion on a long-hand side from the device main body. The end portion on the short-hand side is separated from the end portion on the long-hand side. The sensing cuff is provided on the long-hand side of the curler and an inner circumferential surface on the hand palm side of the wrist. The sensing cuff is fluidly connected to the pump and the pressure sensor.

According to this aspect, the end portion on the short-hand side from the cover portion of the curler, that is, an end portion located on the hand back side of the wrist is separated from the end portion on the long-hand side from the cover portion, that is, an end portion located on the hand palm side of the wrist. As a result, to bring the curler into close contact with a wrist when the blood pressure measurement device is attached to the wrist smaller than an inner circumferential surface shape of the curler, the curler is movable in a direction in which the end portion on the short-hand side and the end portion on the long-hand side of the curler become close to each other without an interference. In addition, a clearance between both end portions allows ensuring an opening shape of the curler large, compared with a configuration in which a clearance is not provided between both end portions, and an operation of expanding the curler from between a first end and a second end is easy. This facilitates inserting the wrist into the curler when the wrist is inserted into the curler. As a result, the blood pressure measurement device improves wearability.

Additionally, the curvature of the end portion on the short-hand side of the curler is set smaller than the curvature of the end portion on the long-hand side. Therefore, in a case where an amount of deformation of the curler becomes large, for example, as in a case where the blood pressure measurement device is attached to a comparatively slim wrist, the second end of the curler is disposed inside of the first end side of the curler, and therefore an interference to the end portion on the short-hand side by the end portion on the long-hand side can be suppressed. Further, even when the sensing cuff is provided on the end portion side on the long-hand side, since the interference between the end portion on the short-hand side and the end portion on the long-hand side can be suppressed as described above, an interference of the sensing cuff to the end portion on the short-hand side can be reduced. As a result, even when the blood pressure measurement device is attached to the comparatively slim wrist, the curler can be deformed following a shape in the circumferential direction of the wrist. Thus, the sensing cuff can be brought into close contact with the wrist, allowing suitable blood pressure measurement.

In the blood pressure measurement device according to one aspect described above, there is provided a blood pressure measurement device in which the curler has the end portion on the short-hand side disposed outward in a width direction of the wrist with respect to the end portion on the long-hand side.

According to this aspect, since the end portion on the short-hand side of the curler is disposed outward in the width direction of the wrist than the end portion on the long-hand side, a dimension from the cover portion to the end portion on the short-hand side in the width direction of the wrist is greater than a dimension from the cover portion to the end portion on the long-hand side in the width direction of the wrist. In addition, since the curvature of the end portion on the short-hand side is smaller than the curvature of the end portion on the long-hand side, the end portion on the short-hand side has a shape overlapping with the end portion on the long-hand side. Thus, when the curler deforms toward the wrist, the end portion on the long-hand side is further movable toward an inside of the end portion on the short-hand side, so the interference of the end portion on the long-hand side to the end portion on the short-hand side can be suppressed. This allows the blood pressure measurement device to bring the sensing cuff into close contact with the further slim wrist.

In the blood pressure measurement device according to one aspect described above, there is provided a blood pressure measurement device that includes a tensile cuff and a pressing cuff. The tensile cuff includes a plurality of bag-like structures provided on an inner circumferential surface on the hand back side of the wrist of the curler. The pressing cuff is provided on an inner circumferential surface on the hand palm side of the wrist of the curler. The sensing cuff is provided on the wrist side of the pressing cuff.

According to this aspect, even when the tensile cuff including the plurality of bag-like structures where a thickness becomes thick is provided on the short-hand side, the end portion on the long-hand side moves inside the end portion on the short-hand side, and the curvature of the long-hand side is greater than that of the short-hand side. This allows suppressing the interference of the end portion on the long-hand side to the tensile cuff when the curler is deformed in a direction in which the sensing cuff is in close contact with the wrist.

In the blood pressure measurement device according to one aspect described above, the plurality of bag-like structures have end portions on the end portion side of the short-hand side located on the cover portion side with respect to the end portion on the short-hand side in an extension direction of the curler gradually heading from the bag-like structure on the curler side toward the bag-like structure on the wrist side of the plurality of bag-like structures.

According to this aspect, the end portions of the plurality of bag-like structures in the tensile cuff are located on the cover portion side as heading from the curler toward the wrist. Thus, when the end portion on the long-hand side moves toward the end portion on the short-hand side, the interference to the tensile cuff by the end portion on the long-hand side can be suppressed.

In the blood pressure measurement device according to one aspect described above, there is provided a blood pressure measurement device that includes a first belt provided on a first side in the circumferential direction of the wrist of the device main body, a second belt provided on a second side in the circumferential direction of the wrist of the device main body, a belt that includes a connection tool connecting the first belt and the second belt and covers the curler.

According to this aspect, the curler can be pressed to the wrist with the first belt and the second belt, making it possible for the curler to follow a shape of the wrist with the simple configuration.

In the blood pressure measurement device according to one aspect described above, there is provided a blood pressure measurement device that further includes a power feed terminal provided on an outer surface adjacent to the short-hand side of the cover portion of the curler.

According to this aspect, since the curvature of the end portion on the short-hand side is smaller than that of the end portion on the long-hand side, providing the power feed terminal on the short-hand side facilitates, for example, a task of providing the power feed terminal compared to a case where the power feed terminal is provided on the end portion on the long-hand side with the larger curvature. This also similarly facilitates connecting a connector to be connected to the power feed terminal.

In the blood pressure measurement device according to one aspect described above, the plurality of bag-like structures have end portions on the end portion side of the short-hand side located on the cover portion side with respect to the end portion on the short-hand side in an extension direction of the curler gradually heading from the bag-like structure on the curler side toward the bag-like structure on the wrist side of the plurality of bag-like structures.

According to this aspect, the end portions of the plurality of bag-like structures in the tensile cuff are located on the cover portion side as heading from the curler toward the wrist. Thus, when the end portion on the long-hand side moves toward the end portion on the short-hand side, the interference to the tensile cuff by the end portion on the long-hand side can be suppressed.

Advantageous Effects of Invention

The present invention can provide the blood pressure measurement device that allows improving wearability and allows suitably bringing the cuff into close contact with the wrist.

BRIEF DESCRIPTION OF DRAWINGS

FIG. 1 is a perspective view illustrating a configuration of a blood pressure measurement device according to a first embodiment of the present invention.

FIG. 2 is an exploded perspective view illustrating the configuration of the blood pressure measurement device.

FIG. 3 is a side view illustrating the configuration of the blood pressure measurement device.

FIG. 4 is an explanatory diagram illustrating a state in which the blood pressure measurement device is attached to a wrist.

FIG. 5 is an explanatory diagram illustrating a state in which the blood pressure measurement device is attached to the wrist.

FIG. 6 is a block diagram illustrating the configuration of the blood pressure measurement device.

FIG. 7 is a perspective view illustrating the configuration of the blood pressure measurement device.

FIG. 8 is an exploded perspective view illustrating configurations of a curler and a cuff structure of the blood pressure measurement device.

FIG. 9 is a cross-sectional view illustrating the configurations of the curler and the cuff structure of the blood pressure measurement device.

FIG. 10 is a cross-sectional view illustrating the configurations of the curler and the cuff structure of the blood pressure measurement device.

FIG. 11 is a cross-sectional view illustrating a configuration of a tensile cuff of the blood pressure measurement device.

FIG. 12 is a cross-sectional view illustrating a configuration of a tensile cuff of the blood pressure measurement device.

FIG. 13 is a perspective view illustrating the configuration of the curler of the blood pressure measurement device.

FIG. 14 is a side view illustrating the configuration of the curler of the blood pressure measurement device.

FIG. 15 is a plan view illustrating the configuration of the cuff structure of the blood pressure measurement device.

FIG. 16 is a plan view illustrating the configuration of the cuff structure.

FIG. 17 is a plan view illustrating a configuration of a pressing cuff of the blood pressure measurement device.

FIG. 18 is a cross-sectional view illustrating the configuration of the pressing cuff.

FIG. 19 is a plan view illustrating a configuration of a sensing cuff of the blood pressure measurement device.

FIG. 20 is a cross-sectional view illustrating the configuration of the sensing cuff.

FIG. 21 is a flowchart depicting an example of a manufacturing method of the blood pressure measurement device.

FIG. 22 is a flowchart depicting an example of usage of the blood pressure measurement device.

FIG. 23 is a perspective view illustrating an example in which the blood pressure measurement device is attached to the wrist.

FIG. 24 is a perspective view illustrating an example in which the blood pressure measurement device is attached to the wrist.

FIG. 25 is a perspective view illustrating an example in which the blood pressure measurement device is attached to the wrist.

FIG. 26 is a cross-sectional view schematically illustrating a state in which the blood pressure measurement device is attached to the wrist.

FIG. 27 is a cross-sectional view illustrating a configuration of a blood pressure measurement device according to a modification of the present invention.

DESCRIPTION OF EMBODIMENTS

First Embodiment

An example of a blood pressure measurement device 1 according to a first embodiment of the present invention will be exemplified below with reference to FIGS. 1 to 20.

FIG. 1 is a perspective view illustrating a configuration of the blood pressure measurement device 1 according to the first embodiment of the present invention. FIG. 2 is an exploded perspective view illustrating the configuration of the blood pressure measurement device 1. FIG. 3 is a side view illustrating the configuration of the blood pressure measurement device 1. FIG. 4 is an explanatory diagram illustrating a state in which the blood pressure measurement device 1 is attached to a wrist 200. FIG. 5 is an explanatory diagram illustrating a state in which the blood pressure measurement device 1 is attached to the wrist 200, and illustrates a case where the blood pressure measurement device 1 is attached to the wrist 200 comparatively slimmer than that of FIG. 4.

FIG. 6 is a block diagram illustrating the configuration of the blood pressure measurement device 1. FIG. 7 is a perspective view illustrating the blood pressure measurement device 1 in which a part of the configuration is omitted. FIG. 8 is an exploded perspective view illustrating configurations of a curler 5 and a cuff structure 6 of the blood pressure measurement device 1. FIG. 9 is a cross-sectional view illustrating the configurations of the curler 5 and the cuff structure 6 of the blood pressure measurement device 1. FIG. 10 is a cross-sectional view illustrating the configurations of the curler 5 and the cuff structure 6 of the blood pressure measurement device 1. FIG. 11 is a cross-sectional view illustrating a configuration of a tensile cuff 74 of the blood pressure measurement device 1. FIG. 12 is a cross-sectional view illustrating a configuration of the tensile cuff 74 of the blood pressure measurement device 1. FIG. 13 is a perspective view illustrating the configuration of the curler 5 of the blood pressure measurement device 1. FIG. 14 is a side view illustrating the configuration of the curler 5 of the blood pressure measurement device 1. FIG. 15 is a plan view illustrating the configuration of the cuff structure 6 on the wrist 200 side of the blood pressure measurement device 1. FIG. 16 is a plan view illustrating the configuration of the curler 5 on an inner circumferential surface side of the cuff structure 6.

FIG. 17 is a plan view illustrating a configuration of a pressing cuff 71 of the blood pressure measurement device 1. FIG. 18 is a cross-sectional view illustrating the configuration of the pressing cuff 71 by a cross-sectional surface taken along the line XVIII-XVIII in FIG. 17. FIG. 19 is a plan view illustrating a configuration of a sensing cuff 73 of the blood pressure measurement device 1. FIG. 20 is a cross-sectional view illustrating the configuration of the sensing cuff 73 of the blood pressure measurement device 1 by a cross-sectional surface taken along the line XX-XX in FIG. 19.

The blood pressure measurement device 1 is an electronic blood pressure measurement device attached to a living body. The present embodiment will be described using an electronic blood pressure measurement device having an aspect of a wearable device attached to the wrist 200 of the living body.

As illustrated in FIGS. 1 to 7, the blood pressure measurement device 1 includes a device main body 3, a belt 4 that fixes the device main body 3 to the wrist, the curler 5 disposed between the belt 4 and the wrist, the cuff structure 6 including the pressing cuff 71, the sensing cuff 73, and the tensile cuff 74, a fluid circuit 7 fluidly connecting the device main body 3 and the cuff structure 6, and a power feed unit 8 provided in the curler 5.

As illustrated in FIGS. 1 to 7, the device main body 3 includes, for example, a case 11, a display unit 12, an operation unit 13, a pump 14, a flow path unit 15, an on-off valve 16, a pressure sensor 17, a power supply unit 18, a vibration motor 19, and a control substrate 20. The device main body 3 supplies a fluid to the cuff structure 6 using, for example, the pump 14, the on-off valve 16, the pressure sensor 17, and the control substrate 20.

As illustrated in FIGS. 1 to 3, the case 11 includes an outer case 31, a windshield 32 that covers an opening on a side (an outer side) opposite to the wrist 200 side of the outer case 31, a base 33 provided on the wrist 200 side inside the outer case 31, a back cover 35 that covers the wrist 200 side of the outer case 31, and a sealing member 36 provided on the lower surface of the back cover 35.

The outer case 31 is formed in a cylindrical shape. The outer case 31 includes pairs of lugs 31a provided at respective symmetrical positions in the circumferential direction of an outer circumferential surface, and spring rods 31b each provided between the lugs 31a of each of the two pairs of lugs 31a. The windshield 32 is, for example, a circular glass plate.

The base 33 holds the display unit 12, the operation unit 13, the pump 14, the on-off valve 16, the pressure sensor 17, the power supply unit 18, the vibration motor 19, and the control substrate 20. Additionally, the base 33 constitutes a portion of the flow path unit 15 that makes the pump 14 and the cuff structure 6 fluidly continuous.

The back cover 35 is configured in an annular shape opening at the center side. The back cover 35 covers the outer peripheral edge side of the end portion on the wrist 200 side of the outer case 31. The back cover 35 is integrally combined with the curler 5 so that the center opening is covered with the curler 5, thus constituting a back lid that covers the end portion on the wrist 200 side of the outer case 31 together with the curler 5. Specifically, the back cover 35 is fixed to the curler 5 with four first fastening members 35a, and is fixed to the end portion on the wrist 200 side of the outer case 31 with four second fastening members 35b. The back cover 35 includes four hole portions 35c provided in the bottom portion through which the first fastening members 35a, which are fixed to the curler 5, are inserted. The back cover 35 radially protrudes at four locations of the outer circumferential portion, and four hole portions 35d through which the second fastening members 35b fixed to the outer case 31 are inserted are provided at the protruding parts.

The first fastening member 35a and the second fastening member 35b are members that mechanically fix two components, such as screws, bolts, small screws, and rivets. In the present embodiment, the first fastening member 35a and the second fastening member 35b are screws.

The sealing member 36 is, for example, a double-sided tape formed in a shape of a region where the back cover 35 contacts the curler 5. The sealing member 36 is provided between the curler 5 and the back cover 35 to seal between the curler 5 and the back cover 35.

The display unit 12 is disposed on the base 33 of the outer case 31 and directly below the windshield 32. As illustrated in FIG. 6, the display unit 12 is electrically connected to the control substrate 20. The display unit 12 is, for example, a liquid crystal display or an organic electroluminescence display. The display unit 12 displays various types of information including the date and time and measurement results of blood pressure values such as the systolic blood pressure and diastolic blood pressure, heart rate, and the like.

The operation unit 13 is configured to be capable of receiving an instruction input from a user. For example, as illustrated in FIGS. 1 and 6, the operation unit 13 includes a plurality of buttons 41 provided on the case 11, a sensor 42 that detects operations of the buttons 41, and a touch panel 43 provided on the display unit 12 or the windshield 32. When operated by the user, the operation unit 13 converts an instruction into an electrical signal. The sensor 42 and the touch panel 43 are electrically connected to the control substrate 20 to output electrical signals to the control substrate 20.

As the plurality of buttons 41, for example, three buttons are provided. The buttons 41 are supported by the base 33 and protrude from the outer circumferential surface of the outer case 31. The plurality of buttons 41 and a plurality of the sensors 42 are supported by the base 33. The touch panel 43 is integrally provided on the windshield 32, for example.

The pump 14 is, for example, a piezoelectric pump. The pump 14 compresses air and feeds compressed air to the cuff structure 6 through the flow path unit 15. The pump 14 is electrically connected to the control substrate 20.

As illustrated in FIG. 6, the flow path unit 15 constitutes a flow path connecting from the pump 14 to the pressing cuff 71 and the tensile cuff 74 and a flow path connecting from the pump 14 to the sensing cuff 73. Additionally, the flow path unit 15 constitutes a flow path connecting from the pressing cuff 71 and the tensile cuff 74 to the atmosphere, and a flow path connecting from the sensing cuff 73 to the atmosphere. The flow path unit 15 is a flow path of air constituted by, for example, a hollow portion, a groove, a flow path tank, and a tube, provided in, for example, the base 33.

The on-off valve 16 opens and closes a portion of the flow path unit 15. A plurality of the on-off valves 16, as a specific example, the four on-off valves 16 as illustrated in FIG. 6, are provided and selectively open and close the flow path connecting from the pump 14 to the pressing cuff 71 and the tensile cuff 74, the flow path connecting from the pump 14 to the sensing cuff 73, the flow path connecting from the pressing cuff 71 and the tensile cuff 74 to the atmosphere, and the flow path connecting from the sensing cuff 73 to the atmosphere, by the combination of opening and closing of each of the on-off valves 16. As a specific example, the four on-off valves 16 are configured by a first on-off valve 16A, a second on-off valve 16B, a third on-off valve 16C, and a fourth on-off valve 16D. The first on-off valve 16A opens and closes the flow path connecting the pump 14 and the sensing cuff 73. The second on-off valve 16B opens and closes the flow path connecting the pump 14 and the tensile cuff 74. The second on-off valve 16B and the third on-off valve 16C open and close the flow path connecting the pump 14 and the pressing cuff 71. The second on-off valve 16B, the third on-off valve 16C, and the fourth on-off valve 16D open and close the flow path connecting the pump 14 and the atmosphere.

The pressure sensor 17 at least detects the pressure in the sensing cuff 73. The pressure sensor 17 includes, for example, a first pressure sensor 17A and a second pressure sensor 17B. The pressure sensor 17 converts a detected pressure into an electrical signal, and outputs the electrical signal to the control substrate 20. For example, the first pressure sensor 17A and the second pressure sensor 17B are provided in the flow path of the flow path unit 15 connecting the first on-off valve 16A and the sensing cuff 73. The pressing cuff 71, the sensing cuff 73, the tensile cuff 74, and the pump 14 are continuous in these flow paths by opening and closing the respective on-off valves, and thus the pressures in these flow paths corresponds to the pressures in the internal spaces of the pressing cuff 71, the sensing cuff 73, and the tensile cuff 74 to which the pump 14 is connected.

As a specific example, when the first on-off valve 16A is open and the second on-off valve 16B is closed, the pressure sensor 17 detects the pressure in the sensing cuff 73, in other words, the pressure in the flow path unit 15 connecting the pump 14 and the sensing cuff 73. Additionally, when the first on-off valve 16A and the second on-off valve 16B are open and the third on-off valve 16C is closed, the pressure sensor 17 detects the pressure in the sensing cuff 73 and the tensile cuff 74, in other words, the pressure in the flow path unit 15 connecting the pump 14, the sensing cuff 73, and the tensile cuff 74. Furthermore, when the first on-off valve 16A, the second on-off valve 16B, and the third on-off valve 16C are open and the fourth on-off valve 16D is open or closed, the pressure sensor 17 detects the pressure in the pressing cuff 71, the sensing cuff 73, and the tensile cuff 74, in other words, the pressure in the flow path unit 15 connecting the pump 14, the pressing cuff 71, the sensing cuff 73, and the tensile cuff 74.

The power supply unit 18 is, for example, a secondary battery such as a lithium ion battery. As illustrated in FIG. 6, the power supply unit 18 is electrically connected to the control substrate 20. The power supply unit 18 supplies power to the control substrate 20.

As illustrated in FIG. 6, the control substrate 20 includes, for example, a substrate 51, an acceleration sensor 52, a communication unit 53, a storage unit 54, and a control unit 55. The control substrate 20 is constituted by the acceleration sensor 52, the communication unit 53, the storage unit 54, and the control unit 55 that are mounted on the substrate 51.

The substrate 51 is fixed to the base 33 of the case 11 using screws or the like.

The acceleration sensor 52 is, for example, a 3-axis acceleration sensor. The acceleration sensor 52 outputs, to the control unit 55, an acceleration signal representing acceleration of the device main body 3 in three directions orthogonal to each other. For example, the acceleration sensor 52 is used to measure, from the detected acceleration, the amount of activity of a living body to which the blood pressure measurement device 1 is attached.

The communication unit 53 is configured to be able to transmit and receive information to and from an external device wirelessly or by wire. For example, the communication unit 53 transmits information controlled by the control unit 55, and information of a measured blood pressure value, a pulse, and the like to an external device via a network, and receives a program or the like for software update from an external device via a network and sends the program or the like to the control unit 55.

In the present embodiment, the network is, for example, the Internet, but is not limited to this. The network may be a network such as a Local Area Network (LAN) provided in a hospital or may be direct communication with an external device using a cable or the like including a terminal of a predetermined standard such as a USB. Thus, the communication unit 53 may be configured to include a plurality of wireless antennas, micro-USB connectors, or the like.

The storage unit 54 pre-stores program data for controlling the overall blood pressure measurement device 1 and the fluid circuit 7, settings data for setting various functions of the blood pressure measurement device 1, calculation data for calculating a blood pressure value and a pulse from pressure measured by the pressure sensors 17, and the like. Additionally, the storage unit 54 stores information such as a measured blood pressure value and a measured pulse.

The control unit 55 is constituted by one or more CPUs, and controls operation of the overall blood pressure measurement device 1 and operation of the fluid circuit 7. The control unit 55 is electrically connected to and supplies power to the display unit 12, the operation unit 13, the pump 14, each of the on-off valves 16 and the pressure sensors 17. Additionally, the control unit 55 controls operation of the display unit 12, the pump 14, and the on-off valves 16, based on electrical signals output by the operation unit 13 and the pressure sensors 17.

For example, as illustrated in FIG. 6, the control unit 55 includes a main Central Processing Unit (CPU) 56 that controls operation of the overall blood pressure measurement device 1, and a sub-CPU 57 that controls operation of the fluid circuit 7. For example, the main CPU 56 obtains measurement results such as blood pressure values, for example, the systolic blood pressure and the diastolic blood pressure, and the heart rate, from electrical signals output by the pressure sensor 17, and outputs an image signal corresponding to the measurement results to the display unit 12.

For example, the sub-CPU 57 drives the pump 14 and the on-off valves 16 to feed compressed air to the pressing cuff 71 and the sensing cuff 73 when an instruction to measure the blood pressure is input from the operation unit 13. In addition, the sub-CPU 57 controls driving and stopping of the pump 14 and opening and closing of the on-off valves 16 based on electrical signal output by the pressure sensors 17. The sub-CPU 57 controls the pump 14 and the on-off valves 16 to selectively feed compressed air to the pressing cuff 71 and the sensing cuff 73 and selectively depressurize the pressing cuff 71 and the sensing cuff 73.

As illustrated in FIGS. 1, 2, and 7, the belt 4 includes a first belt 61 provided on the first pair of lugs 31a and the first spring rod 31b, a second belt 62 provided on the second pair of lugs 31a and the second spring rod 31b, and a connection tool that connects the first belt 61 and the second belt 62. The belt 4 is wrapped around the wrist 200 with the curler 5 in between. Note that in the present embodiment, the connection tool is a buckle 61b provided with the first belt 61.

The first belt 61 is referred to as a so-called a parent and is configured like a band that can be coupled to the second belt 62. As illustrated in FIGS. 1 to 3, the first belt 61 includes a belt portion 61a and the buckle 61b. The belt portion 61a is configured as a band-like shape. The belt portion 61a is made of an elastically deformable resin material. In addition, the belt portion 61a is flexible and internally includes a sheet-like insert member that suppresses expansion and contraction in long-hand direction of the belt portion 61a. The belt portion 61a includes a first hole portion 61c formed in the first end portion and orthogonal to the long-hand direction of the belt portion 61a and a second hole portion 61d formed in the second end portion and orthogonal to the long-hand direction of the first belt 61.

As illustrated in FIGS. 1, 2, and 4, the first hole portion 61c is provided in the end portion of the belt portion 61a. The first hole portion 61c has an inner diameter at which the spring rod 31b can be inserted into the first hole portion 61c and at which the first belt 61 can rotate with respect to the spring rod 31b. In other words, the first belt 61 is rotatably held by the outer case 31 by disposing the first hole portion 61c between the pair of lugs 31a and around the spring rod 31b.

As illustrated in FIGS. 1 and 2, the second hole portion 61d is provided at the distal end of the belt portion 61a. The buckle 61b is attached to the second hole portion 61d.

As illustrated in FIGS. 1 and 2, the buckle 61b includes a frame body 61e in a rectangular frame shape and a prong 61f rotatably attached to the frame body 61e. A side of the frame body 61e to which the prong 61f is attached is inserted into the second hole portion 61d, and the frame body 61e is attached rotatably with respect to the belt portion 61a.

The second belt 62 is referred to as a so-called blade tip, and is configured in a band-like shape having a width at which the second belt 62 can be inserted into the frame body 61e. The second belt 62 is made of an elastically deformable resin material. In addition, the second belt 62 is flexible and internally includes a sheet-like insert member that suppresses expansion and contraction in long-hand direction of the second belt 62.

In addition, as illustrated in FIGS. 1 and 2, the second belt 62 includes a plurality of small holes 62a into which the prong 61f is inserted. Additionally, the second belt 62 includes a third hole portion 62b provided at first end portion of the second belt 62 and extending orthogonally to the long-hand direction of the second belt 62. The third hole portion 62b has an inner diameter at which the spring rod 31b can be inserted into the third hole portion 62b and at which the second belt 62 can rotate with respect to the spring rod 31b. In other words, the second belt 62 is rotatably held by the outer case 31 by disposing the third hole portion 62b between the pair of lugs 31a and around the spring rod 31b.

Thus, the second belt 62 of the belt 4 is inserted into the frame body 61e, and the prong 61f is inserted into the small hole 62a in the belt 4, the first belt 61 and the second belt 62 are integrally connected together, and the belt 4, together with the outer case 31, comes to have an annular shape following the wrist 200 along the circumferential direction. The belt 4 has the annular shape following the circumferential direction of the wrist 200, thereby pressing the curler 5 and elastically deforming the curler 5 such that the curler 5 follows the circumferential direction of a wrist of a wearer of the blood pressure measurement device 1.

As illustrated in FIGS. 1 to 5, the curler 5 is configured in a band-like shape that curves in such a manner as to follow along the circumferential direction of the wrist 200. The curler 5 is formed with a first end and a second end spaced apart from each other. For example, a first end-side outer surface of the curler 5 is fixed to the back cover 35 of the device main body 3. The first end and the second end of the curler 5 are disposed at positions where the first end and the second end protrude to the first lateral side of the wrist 200 than the back cover 35. Accordingly, the curler 5 has the first end and the second end disposed on the lateral side of the wrist 200 when the blood pressure measurement device 1 is attached to the wrist 200. Furthermore, the first end and the second end of the curler 5 are located adjacent to each other at a predetermined distance from each other. The curler 5 is made of a resin material, for example. As a specific example, the curler 5 is made of polypropylene with a thickness of approximately 1 mm.

As illustrated in FIGS. 1 to 5, as a specific example, the curler 5 is configured in a band-like shape that curves in such a manner as to follow along the circumferential direction of the wrist. Furthermore, the curler 5 includes a circular plate-shaped cover portion 5a provided at a position facing the hand back side of the wrist 200 on the first end side and constituting a back lid together with the back cover 35, and relief portions 5b provided around the cover portion 5a to which the second fastening members 35b, which fix the outer case 31 and the back cover 35, can be moved. For example, in the curler 5, the cover portion 5a and the adjacent portions are formed in a flat plate shape, and the first end side and the second end side with respect to the cover portion 5a are formed so as to curve at a predetermined curvature. A length of the curler 5 from the cover portion 5a to the first end is formed shorter than a length from the cover portion 5a to the second end. As a specific example, in the curler 5, a short-hand 5g side from the cover portion 5a to the first end is disposed on the hand back side of the wrist, and a long-hand 5h side from the cover portion 5a to the second end extends from the hand back side of the wrist to the hand palm side of the wrist 200 through one lateral side.

As illustrated in FIGS. 3, 5, 13, and 14, the curler 5 is formed in a shape such that when the first end and the second end of the curler 5 are close, the second end is positioned on the inner circumferential surface side of the first end. As a specific example, as illustrated in FIG. 14, a width in the width direction of the wrist 200 of the curler 5 is set such that the hand back side of the wrist 200 of the curler 5 becomes greater than that of the hand palm side of the wrist 200 of the curler 5. In other words, a width H1 at an end portion on the short-hand 5g side in the width direction of the wrist 200 of the curler 5 is set to be greater than a width H2 at an end portion on the long-hand 5h side. As a result, the end portion on the short-hand 5g side of the curler 5 is located outward in the width direction of the wrist 200 than the end portion on the long-hand 5h side.

As illustrated in FIG. 14, a radius of curvature on the inner circumference side of the first end on the hand back side of the wrist 200 of the curler 5 is set greater than a radius of curvature on the inner circumference side of the second end on the hand palm side of the wrist 200. In other words, a curvature on the inner circumference side at the end portion of the short-hand 5g of the curler 5 is set smaller than a curvature on the inner circumference side at the end portion of the long-hand 5h. A radius of curvature R1 on the inner circumference side of the end portion on the short-hand 5g side is set to 24.3 mm, for example. A radius of curvature R2 on the inner circumference side of the end portion on the long-hand 5h side is set to 20.91 mm, for example. Additionally, radii of curvature R3, R4, R5 on the inner circumference side from the cover portion 5a side of the long-hand 5h to the end portion side are set to, for example, 22.11 mm for R3, 22.80 mm for R4, and 51.70 mm for R5.

With this configuration, in the curler 5, as illustrated in FIG. 3, when the long-hand 5h of the curler 5 is pressed by the belt 4 toward the wrist 200 side, the long-hand 5h side deforms so that both end portions of the curler 5 are close on each other, and the end portion on the long-hand 5*h* side is disposed inward of the end portion on the short-hand 5*g* side.

Furthermore, the curler 5 has a recess 5*c* in an outer surface adjacent to the short-hand 5*g* side of the cover portion 5*a*. As a specific example, the recess 5*c* is provided in a part of the cover portion 5*a* and an outer surface adjacent to the cover portion 5*a* of the short-hand 5*g*.

The cover portion 5*a* includes an insert member 5*d* for reinforcement that is inserted. The cover portion 5*a* is fixed to the wrist 200 side of the outer case 31 via the fixed back cover 35. The cover portion 5*a* has screw holes 5*e* provided at positions facing the four hole portions 35*c* in the back cover 35 and into which the first fastening members 35*a* to fix the back cover 35 are screwed, and three hole portions 5*f* for connecting the cuff structure 6 to the device main body 3.

When the back cover 35 is fixed to the outer case 31 from the back cover 35 side with the second fastening members 35*b*, the relief portions 5*b* serve as a relief to dispose the second fastening members 35*b* on the back cover 35 without an interference of the second fastening members 35*b* to the curler 5 and dispose tools to rotate the second fastening members 35*b*.

The three hole portions 5*f* are a first hole portion 5*f*1 formed to have an inner diameter into which a connection portion 84 described later of the pressing cuff 71 can be inserted, a second hole portion 5*f*2 formed to have an inner diameter into which a connection portion 93 described later of the sensing cuff 73 can be inserted, and a third hole portion 5*f*3 formed to have an inner diameter into which a connection portion 103 described later of the tensile cuff 74 can be inserted. In the present embodiment, the second hole portion 5*f*2 is disposed on the second end side of the hand palm side in the cover portion 5*a* of the curler 5 than the first hole portion 5*f*1 and the third hole portion 5*f*3.

The curler 5 is fixed to the outer case 31 in the direction in which the first end and the second end face the second belt 62 of the belt 4. In the curler 5, at least a position facing the hand palm side of the wrist 200 curves along the circumferential direction along the hand palm side of the wrist 200 to hold the cuff structure 6 facing the hand palm side of the wrist 200 in a curved state following the shape of the hand palm side of the wrist 200.

The curler 5 has hardness to provide flexibility and shape retainability. Here, "flexibility" refers to deformation of the shape of the curler 5 in a radial direction at the time of application of an external force of the belt 4 to the curler 5. For example, "flexibility" refers to deformation of the shape of the curler 5 in a side view in which the curler 5 approaches the wrist, is along the shape of the wrist, or follows to the shape of the wrist when the curler 5 is pressed by the belt 4. Furthermore, "shape retainability" refers to the ability of the curler 5 to maintain a pre-imparted shape when no external force is applied to the curler 5. For example, "shape retainability" refers to, in the present embodiment, the ability of the curler 5 to maintain the shape in a shape curving along the circumferential direction of the wrist.

The cuff structure 6 is disposed on an inner circumferential surface of the curler 5, and is held along the shape of the inner circumferential surface of the curler 5. As a specific example, the curler 5 holds the cuff structure 6 by disposing the pressing cuff 71 and the tensile cuff 74 on the inner circumferential surface and fixing the cuff structure 6 with bonding layers 75 provided between the curler 5, the pressing cuff 71, and the tensile cuff 74. In the present embodiment, the bonding layer 75 is an adhesive or a double-sided tape.

As illustrated in FIGS. 1 to 7, 15, and 16, the cuff structure 6 includes the pressing cuff 71, a back plate 72, the sensing cuff 73, and the tensile cuff 74. The cuff structure 6 also includes the bonding layers 75 that bond the respective configurations and the curler 5 and the cuffs 71, 74 together. The cuff structure 6 is fixed to the curler 5. The cuff structure 6 includes the pressing cuff 71, the back plate 72, and the sensing cuff 73 that are stacked each other and disposed on the curler 5, and the tensile cuff 74 that is spaced apart from the pressing cuff 71, the back plate 72, and the sensing cuff 73 and disposed on the curler 5.

As a specific example, as illustrated in FIGS. 1, 2, and 8, the cuff structure 6 is stacked and fixed on the inner circumferential surface on the hand palm side of the wrist 200 of the curler 5 with the pressing cuff 71, the back plate 72, and the sensing cuff 73 in this order from the inner circumferential surface of the curler 5 toward the wrist 200 side. In addition, the cuff structure 6 includes the tensile cuff 74 disposed on the inner circumferential surface on the hand back side of the wrist 200 of the curler 5. Each of the members of the cuff structure 6 is fixed to an adjacent member of the cuff structure 6 in a stacking direction with the bonding layer 75.

The pressing cuff 71 is fluidly connected to the pump 14 through the flow path unit 15. The pressing cuff 71 is inflated to press the back plate 72 and the sensing cuff 73 toward the wrist 200 side. As illustrated in FIGS. 9, 10, and 15 to 18, the pressing cuff 71 includes a plurality of, for example, two layers of air bags 81, joined portions 82 provided on the air bag 81 facing the curler 5, a flow path body 83 in communication with the air bag 81, and the connection portion 84 provided on the distal end of the flow path body 83. The pressing cuff 71 is configured by integrally welding a plurality of sheet members 86.

Here, the air bags 81 are bag-like structures, and in the present embodiment, the blood pressure measurement device 1 is configured to use air with the pump 14, and thus the present embodiment will be described using the air bags. However, in a case where a fluid other than air is used, the bag-like structures only need to be fluid bags inflated by the fluid. The plurality of air bags 81 are stacked and are in fluid communication with one another in the stacking direction.

The air bag 81 is formed in a rectangular bag shape that is long in one direction. Additionally, the air bag 81 has a width in the short-hand direction set to be the same width as a width in the short-hand direction of the curler 5. The air bag 81 is constituted, for example, by combining the two sheet members 86 and thermally welding the sheet members 86 in a rectangular frame shape long in one direction, like a welded portion 81*a* illustrated in FIGS. 9, 10, and 15 to 18. In addition, the two layers of the air bags 81 are formed by thermally welding the two air bags 81 and combining them integrally, or welding the facing sheet members 86 of the adjacent air bags 81 and then welding the air bags 81, thus forming the air bags 81. As a specific example, the two layers of the air bags 81 are fluidly continuous with openings provided in the sheet members 86 facing each other. In addition, in the two layers of the air bags 81, bridge welding is performed on the facing sheet members 86 so as to have a quadrilateral frame shape smaller than the welded portions 81*a* located on the outer peripheral edges, and surrounding the plurality of openings with bridge welded portions 81*b* to integrally form the adjacent air bags 81, and thus the air bags 81 are fluidly connected inside the bridge welded portions 81*b*. Here, the bridge welding and the bridge of the bridge welded portions 81*b* mean integral joining of the adjacent air bags 81.

One or a plurality of the joined portions 82 are provided on at least a part of an edge portion of the air bag 81 disposed adjacent to the curler 5. The joined portion 82 is formed by a part of the sheet member 86 constituting the air bag 81.

In the present embodiment, as illustrated in FIGS. 9, 10, and 15 to 18, an example in which one joined portion 82 is provided at each edge portion in the short-hand direction of the air bag 81 will be described. Note that, for example, the joined portions 82 may be divided in the long-hand direction of the air bag 81 by a slit, or a plurality of the joined portions 82 may be provided in the long-hand direction of the air bag 81. The joined portions 82 are joined to at least the outer circumferential surface of the curler 5 when the pressing cuff 71 is disposed on the inner circumferential surface of the curler 5. Furthermore, for example, the two joined portions 82 are stacked and welded.

Note that the two joined portions 82 are set, for example, to have lengths that differ in the short-hand direction of the air bag 81. In this example, the two joined portions 82 are stacked and welded on the first end side in the short-hand direction of the curler 5. As long as the distal ends can be disposed on the outer circumferential surface of the curler 5, the lengths of the two joined portions 82 can be appropriately set, and may be or need not to be stackable. However, when the lengths of the joined portions 82 are set to be stackable, the lengths are preferably set such that the distal ends do not extend outward than the outer edges of the outer circumferential surface of the curler 5.

As illustrated in FIGS. 8 and 15 to 18, the flow path body 83 is integrally provided on one air bag 81, for example, a part of a first edge portion in the long-hand direction of the air bag 81 adjacent to the curler 5. As a specific example, the flow path body 83 is provided at an end portion of the air bag 81 near the device main body 3. Additionally, the flow path body 83 is formed in a shape that is long in one direction with a width smaller than the width in the short-hand direction of the air bag 81, and its distal end is formed in a circular shape. The flow path body 83 includes the connection portion 84 at the distal end. The flow path body 83 is connected to the flow path unit 15 via the connection portion 84, thus constituting a flow path between the flow path unit 15 of the device main body 3 and the air bag 81.

The flow path body 83 is configured by thermally welding a part of the sheet members 86 adjacent to the region constituting the air bag 81 of the sheet members 86 in a frame shape long in one direction with the connection portion 84 disposed in the two sheet members 86. The flow path body 83 is disposed between the inner circumferential surface of the curler 5 and the tensile cuff 74, and its distal end is disposed on the main surface on the wrist 200 side of the region where the cover portion 5*a* of the curler 5 is provided and at a position facing the first hole portion 5/1. In addition, a width of the flow path body 83 excluding a welded portion 83*a* is formed to, for example, 3.8 mm.

Note that the air bag 81 in which the flow path body 83 is provided is configured by configuring a part of the welded portions 81*a* to weld the two sheet members 86 in the rectangular frame shape in a non-welded state such that the air bag 81 is continuous with the welded portion 83*a* constituting the flow path body 83, and thus the air bag 81 is fluidly continuous with the flow path body 83.

The connection portion 84 is, for example, a nipple. The connection portion 84 is provided at the distal end of the flow path body 83. The distal end of the connection portion 84 is exposed from the sheet member 86 facing the curler 5 among the two sheet members 86 constituting the flow path body 83. The connection portion 84 is inserted through the first hole portion 5/1 of the cover portion 5*a* and is connected to the flow path unit 15.

As a specific example, as illustrated in FIGS. 9, 10, and 26, the pressing cuff 71 includes, from the wrist 200 side, a first sheet member 86*a*, a second sheet member 86*b*, a third sheet member 86*c*, and a fourth sheet member 86*d*. The second sheet member 86*b* constitutes the first-layer air bag 81 along with the first sheet member 86*a*, the third sheet member 86*c* is integrally joined to the second sheet member 86*b* and constitutes the joined portions 82, and the fourth sheet member 86*d* constitutes the second-layer air bag 81 and the flow path body 83 with the third sheet member 86*c*. Note that the pressing cuff 71 is integrally constituted by joining the adjacent sheet members 86 by thermal welding.

The first sheet member 86*a* and the second sheet member 86*b* are formed to have the rectangular shape similar to the air bag 81, and the peripheral edge portions of the four sides are welded to constitute the air bag 81. The second sheet member 86*b* and the third sheet member 86*c* are disposed facing each other, and include a plurality of openings 86*b*1 and 86*c*1, respectively, through which the two air bags 81 are fluidly continuous. Additionally, the second sheet member 86*b* and the third sheet member 86*c* are integrally joined by thermally welding the peripheries of the plurality of openings 86*b*1, 86*c*1 in a quadrilateral frame shape smaller than the four sides where the air bag 81 is welded.

The third sheet member 86*c* is configured in a shape so as to ensure configuring the air bag 81, the joined portions 82, and the flow path body 83, for example. The fourth sheet member 86*d* is configured in a shape so as to ensure configuring the air bag 81 and the flow path body 83, for example. Furthermore, the fourth sheet member 86*d* has a hole portion 86*d*1 into which the distal end of the connection portion 84 can be inserted, for example.

The third sheet member 86*c* and the fourth sheet member 86*d* are disposed so as to face each other and are thermally welded along the peripheral edge shapes of the air bag 81 and the flow path body 83 so that the air bag 81 and the flow path body 83 are fluidly continuous, and cut into predetermined shapes to constitute the air bag 81, the joined portions 82, and the flow path body 83.

The connection portion 84 is disposed in the hole portion 86*d*1 of the fourth sheet member 86*d*, and the periphery of the hole portion 86*d*1 is thermally welded with the connection portion 84. Further, each of the fourth sheet member 86*d* is bonded to the inner circumferential surface of the curler 5 and the joined portion 82 of the third sheet member 86*c* is bonded to the outer circumferential surface of the curler 5 via the bonding layers 75.

As illustrated in FIGS. 9, 10, and 26, the back plate 72 is stuck to the outer surface of the first sheet member 86*a* of the pressing cuff 71 with the bonding layer 75. The back plate 72 is formed in a plate shape using a resin material. The back plate 72 is made of polypropylene, for example, and is formed into a plate shape having a thickness of approximately 1 mm. The back plate 72 has shape followability.

Here, "shape followability" refers to a function of the back plate 72 by which the back plate 72 can be deformed in such a manner as to follow the shape of a contacted portion of the wrist 200 to be disposed, and the contacted portion of the wrist 200 refers to a region of the wrist 200 that is faced by the back plate 72. The contact here includes both direct contact and indirect contact via the sensing cuff 73.

For example, as illustrated in FIG. 10, the back plate 72 includes a plurality of grooves 72a in both main surfaces that extend in a direction orthogonal to the long-hand direction of the back plate 72. The plurality of respective grooves 72a face each other in the thickness direction of the back plate 72. Additionally, the plurality of grooves 72a are disposed at equal intervals in the long-hand direction of the back plate 72.

In the back plate 72, portions including the plurality of grooves 72a are thinner than portions including no grooves 72a and thus the portions including the plurality of grooves 72a are easily deformed. Accordingly, the back plate 72 is deformed in such a manner as to follow to the shape of the wrist 200, and has shape followability of extending in the circumferential direction of the wrist. The back plate 72 is formed such that the length of the back plate 72 is sufficient to cover the hand palm side of the wrist 200. The back plate 72 transfers the pressing force from the pressing cuff 71 to the main surface on the back plate 72 side of the sensing cuff 73 in a state in which the back plate 72 runs along the shape of the wrist 200.

The sensing cuff 73 is fluidly connected to the pump 14 through the flow path unit 15. The sensing cuff 73 is fixed to the main surface on the wrist 200 side of the back plate 72. As illustrated in FIGS. 4 and 26, the sensing cuff 73 is in direct contact with a region of the wrist 200 where an artery 210 is present. The artery 210 as used herein is the radial artery and the ulnar artery. The sensing cuff 73 is formed in the same shape as that of the back plate 72 or a shape that is smaller than that of the back plate 72, in the long-hand direction and the width direction of the back plate 72. The sensing cuff 73 is inflated to compress a hand palm-side region of the wrist 200 in which the artery 210 resides. The sensing cuff 73 is pressed by the inflated pressing cuff 71 toward the wrist 200 side with the back plate 72 in between.

As a specific example, as illustrated in FIGS. 9, 10, 15, 16, 19, and 20, the sensing cuff 73 includes one air bag 91, a flow path body 92 in communication with the air bag 91, and the connection portion 93 provided on a distal end of a flow path body 92. One main surface of the air bag 91 of the sensing cuff 73 is fixed to the back plate 72. For example, the sensing cuff 73 is bonded to the main surface on the wrist 200 side of the back plate 72 with the bonding layer 75. The sensing cuff 73 is configured by integrally welding a plurality of sheet members 96.

Here, the air bag 91 is a bag-like structure, and in the present embodiment, the blood pressure measurement device 1 is configured to use air with the pump 14, and thus the present embodiment will be described using the air bag. However, in a case where a fluid other than air is used, the bag-like structure may be a liquid bag and the like.

The air bag 91 is constituted in a rectangular shape that is long in one direction. The air bag 91 is constituted, for example, by combining the two sheet members 96 that are long in one direction and thermally welding the sheet members 96 in a rectangular frame shape long in one direction, like a welded portion 91a illustrated in FIGS. 9, 10, 15, 16, 19, and 20. The air bag 91 includes, for example, a bonding margin 91b to ensure an area for bonding the air bag 91 to the back plate 72 using the bonding layer 75. The bonding margin 91b is formed by, for example, the sheet member 96 facing the back plate 72.

The flow path body 92 is integrally provided on a part of a first edge portion in the long-hand direction of the air bag 91. As a specific example, the flow path body 92 is provided at an end portion of the air bag 91 near the device main body 3. Additionally, the flow path body 92 is formed in a shape that is long in one direction with a width smaller than the width in the short-hand direction of the air bag 91, and its distal end is formed in a circular shape. The flow path body 92 includes the connection portion 93 at the distal end. The flow path body 92 includes the connection portion 93 at the distal end. The flow path body 92 is connected to the flow path unit 15 via the connection portion 93, thus constituting a flow path between the flow path unit 15 of the device main body 3 and the air bag 91.

The flow path body 92 is configured by thermally welding a part of the sheet members 96 adjacent to the region constituting the air bag 91 of the sheet members 96 in a frame shape long in one direction with the connection portion 93 disposed in the two sheet members 96. Note that the air bag 91 is configured by configuring a part of the welded portions 91a to weld the two sheet members 96 in the rectangular frame shape in a non-welded state such that the air bag 91 is continuous with a welded portion 92a constituting the flow path body 92, and thus the air bag 91 is fluidly continuous with the flow path body 92. The flow path body 92 is disposed between the inner circumferential surface of the curler 5 and the tensile cuff 74, and its distal end is disposed on the main surface on the wrist 200 side of the region where the cover portion 5a of the curler 5 is provided and at a position facing the second hole portion 5f2. In addition, a width of the flow path body 92 excluding the welded portion 92a is formed to, for example, 3.8 mm.

The connection portion 93 is, for example, a nipple. The connection portion 93 is provided at the distal end of the flow path body 92. The distal end of the connection portion 93 is exposed outside from the sheet member 96 facing the curler 5 and the back plate 72 among the two sheet members 96 constituting the flow path body 92. The connection portion 93 is inserted through the second hole portion 5f2 of the cover portion 5a and is connected to the flow path unit 15.

As a specific example, as illustrated in FIGS. 9 and 10, the sensing cuff 73 includes a fifth sheet member 96a and a sixth sheet member 96b from the wrist 200 side. Note that the sensing cuff 73 is constituted by joining the adjacent sheet members 96 by thermal welding.

The fifth sheet member 96a and the sixth sheet member 96b are configured in a shape so as to ensure configuring the air bag 91, the bonding margin 91b, and the flow path body 92, for example. The fifth sheet member 96a and the sixth sheet member 96b are disposed so as to face each other and are thermally welded along the peripheral edge shapes of the air bag 91 and the flow path body 92 so that the air bag 91 and the flow path body 92 are fluidly continuous, and cut into predetermined shapes to constitute the air bag 91 and the flow path body 92.

Furthermore, the sixth sheet member 96b has a hole portion 96b1 into which the distal end of the connection portion 93 can be inserted, for example. The connection portion 93 is disposed in the hole portion 96b1, and the periphery of the hole portion 96b1 is thermally welded with the connection portion 93. The sixth sheet member 96b is bonded to the inner circumferential surface of the back plate 72 via the bonding layer 75.

The tensile cuff 74 is fluidly connected to the pump 14 through the flow path unit 15. The tensile cuff 74 is inflated to press the curler 5 such that the curler 5 is spaced apart from the wrist 200, thus pulling the belt 4 and the curler 5 toward the hand back side of the wrist 200. The tensile cuff 74 includes a plurality of, for example, six layers of air bags 101, joined portions 102 provided on the air bag 101 facing the curler 5, the connection portion 103 provided on the air bag 101 facing the curler 5, and notch portions 104 provided in at least the air bag 101 facing the curler 5. The tensile cuff 74 is configured by integrally welding a plurality of sheet members 106. The tensile cuff 74 is fixed to a region where the flow path bodies 83, 92 are provided, and the hand back side of the wrist 200 of the curler 5 including the cover portion 5a. That is, the flow path body 83 of the pressing cuff 71 and the flow path body 92 of the sensing cuff 73 are disposed between the hand back side of the wrist 200 of the curler and the tensile cuff 74.

Additionally, the tensile cuff 74 is configured such that the thickness of the tensile cuff 74 in an inflating direction, in the present embodiment, in the direction in which the curler 5 and the wrist 200 face each other, during inflation, is larger than the thickness of the pressing cuff 71 in the inflating direction during inflation and larger than the thickness of the sensing cuff 73 in the inflating direction during inflation. That is, the air bags 101 of the tensile cuff 74 have more layer structures than the air bags 81 in the pressing cuff 71 and the air bag 91 in the sensing cuff 73, and are thicker than the pressing cuff 71 and the sensing cuff 73 when the air bags 101 are inflated from the curler 5 toward the wrist 200.

In the present embodiment, the tensile cuff 74 including the six layers of the air bags 101 includes a first outer layer 111 constituted by one air bag 101, a first intermediate layer 112 constituted by the two layers of the air bags 101 that are thermally welded to the first outer layer 111 to be integrally combined, a second intermediate layer 113 constituted by the two layers of the air bags 101 that are thermally welded to the first intermediate layer 112 to be integrally combined, and a second outer layer 114 constituted by one air bag 101 that is thermally welded to the second intermediate layer 113 to be integrally combined.

Here, the air bags 101 are bag-like structures, and in the present embodiment, the blood pressure measurement device 1 is configured to use air with the pump 14, and thus the present embodiment will be described using the air bags. However, in a case where a fluid other than air is used, the bag-like structures only need to be fluid bags inflated by the fluid. A plurality of the air bags 101 are stacked and are in fluid communication in the stacking direction.

The air bag 101 is formed in a rectangular bag shape that is long in one direction. Additionally, the air bag 101 has a width in the short-hand direction set to be the same width as a width in the short-hand direction of the curler 5. The air bag 101 is constituted, for example, by combining the two sheet members 106 and thermally welding the sheet members 106 in a rectangular frame shape long in one direction, like a welded portion 101a illustrated in FIGS. 11, 12, 15, and 16. The six layers of the air bags 101 are fluidly continuous with openings provided in the sheet members 106 facing each other.

In addition, in the six layers of the air bags 101, bridge welding is performed on the sheet members 106 where the first outer layer 111 and the first intermediate layer 112, the first intermediate layer 112 and the second intermediate layer 113, and the second intermediate layer 113 and the second outer layer 114 each face each other so as to have a quadrilateral frame shape smaller than the welded portions 81a located on the outer peripheral edges, and surrounding the plurality of openings with bridge welded portions 101b to integrally form the adjacent air bags 101, and thus the air bags 101 are fluidly continuous inside the bridge welded portions 101b.

The first outer layer 111 is formed by one air bag 101 disposed on the wrist 200 side. The first outer layer 111 constitutes the air bag 101 of the first layer from the wrist 200 side among the six layers of the air bags 101.

The first intermediate layer 112 is stacked on the first outer layer 111. The first intermediate layer 112 is formed by the two layers of the air bags 101. The first intermediate layer 112 constitutes the air bags 101 of the second layer and the third layer from the wrist 200 side among the six layers of the air bags 101. The first intermediate layer 112 is constituted by integrally welding the two layers of the air bags 101 at the outer peripheral edges. In other words, the first intermediate layer 112 is formed by integrally welding the four sheet members 106 in the outer peripheral edge shapes of the air bags 101.

The second intermediate layer 113 is stacked on the first intermediate layer 112. The second intermediate layer 113 is formed of the two layers of the air bags 101. The second intermediate layer 113 constitutes the air bags 101 of the fourth layer and the fifth layer from the wrist 200 side among the six layers of the air bags 101. The second intermediate layer 113 is constituted by integrally welding the two layers of the air bags 101 at the outer peripheral edges. In other words, the second intermediate layer 113 is formed by integrally welding the four sheet members 106 in the outer peripheral edge shapes of the air bags 101.

The second outer layer 114 is formed by one air bag 101 disposed on the curler 5 side. The second outer layer 114 constitutes the air bag 101 of the sixth layer from the wrist 200 side among the six layers of the air bags 101.

One or a plurality of the joined portions 102 are provided on at least a part of an edge portion of the air bag (the air bag of the sixth layer) 101 disposed adjacent to the curler 5. The joined portion 102 is formed by a part of the sheet member 106 constituting the air bag 101.

In the present embodiment, an example in which the two joined portions 102 are provided at each edge portion in the short-hand direction of the air bag 101 in the long-hand direction of the air bag 101 will be described. Note that, for example, the joined portions 102 are provided on the air bag 101 avoiding a position facing the cover portion 5a of the curler 5. Further, for example, the joined portion 102 includes a relief portion 102a at a position facing power feed terminals 8b, which will be described later, of the power feed unit 8 provided in the curler 5, to expose the power feed terminals 8b to the outside. The relief portion 102a is, for example, an opening that can expose the power feed terminals 8b to the outside, and has a circular as an example.

The joined portions 102 are joined to at least the outer circumferential surface of the curler 5 when the tensile cuff 74 is disposed on the inner circumferential surface of the curler 5. Additionally, the joined portions 102 disposed at the same position in the short-hand direction of the air bags 101 are stacked and welded.

Note that the two joined portions 102 are set, for example, to have lengths that differ in the short-hand direction of the air bag 101. In this example, the two joined portions 102 are stacked and welded on the first end side in the short-hand direction of the curler 5. As long as the distal ends can be disposed on the outer circumferential surface of the curler 5, the lengths of the two joined portions 102 can be appropriately set, and may be or need not to be stackable. However, when the lengths of the joined portions 102 are set to be stackable, the lengths are preferably set such that the distal ends do not extend outward than the outer edges of the outer circumferential surface of the curler 5.

The connection portion 103 is, for example, a nipple. The connection portion 103 is disposed on the center side in the long-hand direction of the air bag 101 disposed adjacent to the curler 5 and at a position facing the third hole portion 5/3 in the cover portion 5a. The distal end of the connection portion 103 is exposed from the sheet member 106 facing the curler 5 among the two sheet members 106 constituting the air bag 101. The connection portion 103 is inserted through the third hole portion 5/3 in the cover portion 5a and is connected to the flow path unit 15.

The notch portions 104 are provided at positions facing the relief portions 5b provided on the curler 5. The notch portions 104 are provided in the air bag 101 of the sixth layer that forms the second outer layer 114.

As a specific example, as illustrated in FIGS. 11 and 12, the tensile cuff 74 includes a seventh sheet member 106a, an eighth sheet member 106b, a ninth sheet member 106c, a tenth sheet member 106d, an eleventh sheet member 106e, a twelfth sheet member 106f, a thirteenth sheet member 106g, a fourteenth sheet member 106h, a fifteenth sheet member 106i, a sixteenth sheet member 106j, a seventeenth sheet member 106k, and an eighteenth sheet member 106l in this order from the wrist 200 side. Note that the tensile cuff 74 is integrally constituted by joining the adjacent sheet members 106 by thermal welding.

The seventh sheet member 106a to the eighteenth sheet member 106l are configured in a rectangular shape similar to the air bag 101. The seventh sheet member 106a and the eighth sheet member 106b are thermally welded along the shapes of the peripheral edge portions of the four sides of the air bag 101 to constitute the air bag 101 of the first layer (the first layer) from the wrist 200 side. That is, the seventh sheet member 106a and the eighth sheet member 106b constitute the first outer layer 111.

The eighth sheet member 106b and the ninth sheet member 106c are disposed facing each other, and include a plurality of openings 106b1, 106c1, respectively, through which the two air bags 101 are fluidly continuous. Additionally, the eighth sheet member 106b and the ninth sheet member 106c are integrally joined by bridge welding by heat on the peripheries of the plurality of openings 106b1, 106c1 in a quadrilateral frame shape smaller than the four sides where the air bag 101 is welded.

The ninth sheet member 106c and the tenth sheet member 106d are thermally welded along the shapes of the peripheral edge portions of the four sides of the air bag 101 to constitute the air bag 101 of the second layer (the second layer) from the wrist 200 side.

As illustrated in FIGS. 11 and 12, the tenth sheet member 106d and the eleventh sheet member 106e are disposed facing each other, and include a plurality of openings 106d1, 106e1, respectively, through which the two air bags 101 are fluidly continuous. The eleventh sheet member 106e and the twelfth sheet member 106f are thermally welded along the shapes of the peripheral edge portions of the four sides of the air bag 101 to constitute the air bag 101 of the third layer (the third layer) from the wrist 200 side.

Note that the ninth sheet member 106c, the tenth sheet member 106d, the eleventh sheet member 106e, and the twelfth sheet member 106f are integrally and thermally welded along the shapes of the peripheral edge portions of the four sides of the air bags 101 to constitute the first intermediate layer 112 in which the air bags 101 of the second layer and the third layer are integrally formed.

As illustrated in FIGS. 11 and 12, the twelfth sheet member 106f and the thirteenth sheet member 106g are disposed facing each other, and include a plurality of openings 106f1, 106g1, respectively, through which the two air bags 101 are fluidly continuous. Additionally, the twelfth sheet member 106f and the thirteenth sheet member 106g are integrally joined by bridge welding by heat on the peripheries of the plurality of openings 106f1, 106g1 in a quadrilateral frame shape smaller than the four sides where the air bag 101 is welded.

The thirteenth sheet member 106g and the fourteenth sheet member 106h are thermally welded along the shapes of the peripheral edge portions of the four sides of the air bag 101 to constitute the air bag 101 of the fourth layer (the fourth layer) from the wrist 200 side.

As illustrated in FIGS. 11 and 12, the fourteenth sheet member 106h and the fifteenth sheet member 106i are disposed facing each other, and include a plurality of openings 106h1, 106i1, respectively, through which the two air bags 101 are fluidly continuous. The fifteenth sheet member 106i and the sixteenth sheet member 106j are thermally welded along the shapes of the peripheral edge portions of the four sides of the air bag 101 to constitute the air bag 101 of the fifth layer (the fifth layer) from the wrist 200 side.

Note that the thirteenth sheet member 106g, the fourteenth sheet member 106h, the fifteenth sheet member 106i, and the sixteenth sheet member 106j are integrally and thermally welded along the shapes of the peripheral edge portions of the four sides of the air bags 101 to constitute the second intermediate layer 113 in which the air bags 101 of the fourth layer and the fifth layer are integrally formed.

As illustrated in FIGS. 11 and 12, the sixteenth sheet member 106j and the seventeenth sheet member 106k are disposed facing each other, and include a plurality of openings 106j1, 106k1, respectively, through which the two air bags 101 are fluidly continuous. The seventeenth sheet member 106k is configured in a shape so as to ensure configuring the air bag 101 and the joined portions 102, for example. The sixteenth sheet member 106j and the seventeenth sheet member 106k are integrally joined by bridge welding by heat on the peripheries of the plurality of openings 106j1, 106k1 in a quadrilateral frame shape smaller than the four sides where the air bag 101 is welded.

The seventeenth sheet member 106k and the eighteenth sheet member 106l are thermally welded along the shapes of the peripheral edge portions of the four sides of the air bag 101 and cut into predetermined shapes to constitute the air bag 101 of the sixth layer (the sixth layer) from the wrist 200 side including the notch portions 104 and the joined portions 102.

Furthermore, the eighteenth sheet member 106l has a hole portion 106l1 into which the distal end of the connection portion 103 can be inserted, for example. The connection portion 103 is disposed in the hole portion 106l1 of the eighteenth sheet member 106l, and the periphery of the hole portion 106l1 is thermally welded with the connection portion 103. Further, each of the eighteenth sheet member 106l is bonded to the inner circumferential surface of the curler 5 and the joined portions 102 of the seventeenth sheet member 106k are bonded to the outer circumferential surface of the curler 5 via the bonding layer 75.

Additionally, each of the sheet members 86, 96, and 106 forming the pressing cuff 71, the sensing cuff 73, and the tensile cuff 74 are made of a thermoplastic resin material. The thermoplastic resin material is a thermoplastic elastomer. Examples of thermoplastic resin material constituting the sheet members 86, 96, and 106 include thermoplastic polyurethane based resin (hereinafter referred to as TPU), polyvinyl chloride resin, ethylene-vinyl acetate resin, thermoplastic polystyrene based resin, thermoplastic polyolefin resin, thermoplastic polyester based resin, and thermoplastic polyamide resin. Note that, in the pressing cuff 71 and the sensing cuff 73, among at least the plurality of sheet members 86 and 106 constituting the air bags 81 and 101, at least the sheet members 86 and 106 welded to the curler 5 are made of a material same kind of the material of the curler 5.

For example, the sheet members 86, 96, and 106 are formed using a molding method such as T-die extrusion molding or injection molding. After being molded by each molding method, the sheet members 86, 96, and 106 are sized into predetermined shapes, and the sized individual pieces are joined by welding or the like to constitute bag-like structures 81, 91, and 101. A high frequency welder or laser welding is used as the welding method.

The fluid circuit 7 is constituted by the case 11, the pump 14, the flow path unit 15, the on-off valves 16, the pressure sensors 17, the pressing cuff 71, the sensing cuff 73, and the tensile cuff 74. A specific example of the fluid circuit 7 will be described below.

As illustrated in FIG. 6, the fluid circuit 7 includes, for example, a first flow path 7*a* in which the pump 14 and the sensing cuff 73, and the first pressure sensor 17A and the second pressure sensor 17B are continuous via the first on-off valve 16A, a second flow path 7*b* configured by being branched from the first flow path 7*a* between the pump 14 and the first on-off valve 16A in which the pump 14 and the atmosphere are continuous via the second on-off valve 16B, the third on-off valve 16C, and the fourth on-off valve 16D in order, a third flow path 7*c* configured by being branched from the middle portion between the second on-off valve 16B and the third on-off valve 16C of the second flow path 7*b* in which the tensile cuff 74 is continuous from the pump 14, and a fourth flow path 7*d* configured by being branched from the middle portion between the third on-off valve 16C and the fourth on-off valve 16D of the second flow path 7*b* in which the pressing cuff 71 is continuous from the pump 14.

In the fluid circuit 7, the second on-off valve 16B and the third on-off valve 16C are opened and the first on-off valve 16A and the fourth on-off valve 16D are closed to connect the third flow path 7*c* and the fourth flow path 7*d* branched from the second flow path 7*b* to the pump 14, and the pump 14, the pressing cuff 71, and the tensile cuff are fluidly connected.

In the fluid circuit 7, the first on-off valve 16A, the second on-off valve 16B, and the third on-off valve 16C are opened and the fourth on-off valve 16D is closed to connect the first flow path 7*a* and the third flow path 7*c* and the fourth flow path 7*d* branched from the second flow path 7*b* to the pump 14, and the pump 14, the pressing cuff 71, and the tensile cuff, and the pump 14 and the sensing cuff 73 are fluidly connected. In the fluid circuit 7, the second on-off valve 16B, the third on-off valve 16C, and the fourth on-off valve 16D are opened and the first on-off valve 16A is closed to connect the second flow path 7*b*, the third flow path 7*c*, and the fourth flow path 7*d* to the pump 14, and the pump 14, the pressing cuff 71, the tensile cuff 74, and the atmosphere are fluidly connected. In the fluid circuit 7, the first on-off valve 16A, the second on-off valve 16B, the third on-off valve 16C, and the fourth on-off valve 16D are opened to connect the first flow path 7*a*, the second flow path 7*b*, the third flow path 7*c*, and the fourth flow path 7*d* to the pump 14, and the pump 14, the pressing cuff 71, the sensing cuff 73, the tensile cuff 74, and the atmosphere are fluidly connected.

As illustrated in FIGS. 2, 7, and 8, the power feed unit 8 is provided in the recess 5*c* formed in the outer surface on the first end side of the curler 5 protruding from the device main body 3. For example, the power feed unit 8 is configured to be connectable to a connector provided on a charging cable of a charger.

As illustrated in FIGS. 2, 7, and 8, the power feed unit 8 includes a wiring portion 8*a*, the power feed terminals 8*b*, and a cover 8*c* that covers the wiring portion 8*a* disposed in the recess 5*c* of the curler 5. The wiring portion 8*a* has a first end connected to the power feed terminals 8*b* and the second end connected to the control unit 55. The power feed terminals 8*b* are constituted by two circular terminals, for example. For example, the wiring portion 8*a* and the power feed terminals 8*b* are formed by, for example, flexible printed circuits (FPC) in which, for example, a conductive metal film is provided on a base film, such as polyimide. The cover 8*c* is formed in the same shape as the recess 5*c*, covers the recess 5*c*, and when provided in the recess 5*c*, its upper surface is flush with the outer surface on the short-hand side of the curler 5.

Next, an example of a manufacturing method of the blood pressure measurement device 1 will be described below using FIG. 21.

First, the power feed unit 8 is formed in the curler 5 (step ST11). The FPC constituting the wiring portion 8*a* and the power feed terminals 8*b* in the curler 5 are bonded to the cover portion 5*a* and the recess 5*c* of the curler 5 with, for example, a double-sided tape, and the cover 8*c* is bonded to the recess 5*c* with, for example, a double-sided tape.

Next, the cuff structure 6 is joined to the curler 5 (step ST12). As a specific example, first, the back plate 72 is disposed in a curved jig, and the back plate 72 is overheated by a heating furnace for a thermal process to curve the back plate 72 in a predetermined shape. Next, the double-sided tapes as the bonding layers 75 are stuck to a region facing the curler 5 of the fourth sheet member 86*d* of the pressing cuff 71 and the joined portions 82 to stick the pressing cuff 71 to the curler 5. Next, the double-sided tape is stuck to a region facing the back plate 72 of the sixth sheet member 96*b* of the sensing cuff 73 to stick the sensing cuff 73 to the back plate 72. Note that in these steps, the connection portion 84 of the pressing cuff 71 and the connection portion 93 of the sensing cuff 73 are inserted through the first hole portion 5/1 and the second hole portion 5/2 in the cover portion 5*a* of the curler 5.

Next, the double-sided tape is stuck to a region facing the pressing cuff 71 of the back plate 72 to stick the back plate 72 to the first sheet member 86*a* of the pressing cuff 71. Next, double-sided tapes are stuck to a region facing the curler 5 of the eighteenth sheet member 106*l* and the joined portions 102 of the tensile cuff 74 to stick the tensile cuff 74 to the curler 5 and the flow path body 83 of the pressing cuff 71 and the flow path body 92 of the sensing cuff 73 disposed on the inner surface of the curler 5. Through these steps, the cuff structure 6 is bonded to the curler 5.

Next, the sealing member 36 and the back cover 35 are disposed on the cover portion 5*a*, and the back cover 35 is fixed to the cover portion 5*a* with the first fastening members 35*a* (step ST13) to constitute the back lid.

Next, the device main body 3 except for the back cover 35 is integrally assembled (step ST14). Next, the back cover 35 is disposed on an end portion on the wrist 200 side of the outer case 31 of the device main body 3, and the outer case 31 and the back cover 35 are fixed with the second fastening members 35*b* (step ST15). Then, the first belt 61 and the second belt 62 are assembled to the outer case 31 (step ST16). Through these steps, the blood pressure measurement device 1 is manufactured.

Next, an example of measurement of a blood pressure value using the blood pressure measurement device 1 will be described using FIGS. 22 to 25. FIG. 22 is a flowchart depicting an example of a blood pressure measurement using the blood pressure measurement device 1, depicting both of an operation by a user and an operation by the control unit 55. Additionally, FIGS. 23 to 25 illustrate an example of the user wearing the blood pressure measurement device 1 on the wrist 200.

First, the user attaches the blood pressure measurement device 1 to the wrist 200 (step ST21). As a specific example, for example, the user operates the long-hand 5*h* side of the curler 5 in a direction of separated from the short-hand 5*g*, and expands the opening of the curler 5. As illustrated in FIG. 23, the user inserts the wrists 200 to be attached into the curler 5.

At this time, in the blood pressure measurement device 1, the device main body 3 and the sensing cuff 73 are disposed at opposite positions in the curler 5, and thus the sensing cuff 73 is disposed in a region on the hand palm side of the wrist 200 where the artery 210 is present. Thus, the device main body 3 and the tensile cuff 74 are disposed on the hand back side of the wrist 200. Then, as illustrated in FIG. 24, the user passes the second belt 62 through the frame body 61*e* of the buckle 61*b* of the first belt 61 with the hand opposite to the hand on which the blood pressure measurement device 1 is disposed. Next, the user then pulls the second belt 62 to bring the member on the inner circumferential surface side of the curler 5, that is, the cuff structure 6, into close contact with the wrist 200, and inserts the prong 61*f* into the small hole 62*a*. Thus, as illustrated in FIG. 4, the first belt 61 and the second belt 62 are connected, and the blood pressure measurement device 1 is attached to the wrist 200.

Then, the user operates the operation unit 13 to input an instruction corresponding to the start of measurement of the blood pressure value. The operation unit 13, on which an input operation of the instruction has been performed, outputs an electrical signal corresponding to the start of the measurement to the control unit 55 (step ST22). The control unit 55 receives the electrical signal, and then, for example, opens the first on-off valve 16A, the second on-off valve 16B, and the third on-off valve 16C and closes the fourth on-off valve 16D, and drives the pump 14 to feed compressed air to the pressing cuff 71, the sensing cuff 73, and the tensile cuff 74 through the first flow path 7*a*, the second flow path 7*b*, the third flow path 7*c*, and the fourth flow path 7*d* (step ST23). Thus, the pressing cuff 71, the sensing cuff 73, and the tensile cuff 74 start to be inflated.

The first pressure sensor 17A and the second pressure sensor 17B detect the pressures in the pressing cuff 71, the sensing cuff 73, and the tensile cuff 74, and outputs, to the control unit 55, electrical signals corresponding to the pressures (step ST24). Based on the received electrical signals, the control unit 55 determines whether the pressures in the internal spaces of the pressing cuff 71, the sensing cuff 73, and the tensile cuff 74 have reached a predetermined pressure for measurement of the blood pressure (step ST25). For example, in a case where the internal pressures of the pressing cuff 71 and the tensile cuff 74 have not reached the predetermined pressure and the internal pressure of the sensing cuff 73 has reached the predetermined pressure, the control unit 55 closes the first on-off valve 16A and feeds compressed air through the first flow path 7*a*, the second flow path 7*b*, the third flow path 7*c*, and the fourth flow path 7*d*.

When the internal pressures of the pressing cuff 71 and the tensile cuff 74 and the internal pressure of the sensing cuff 73 all have reached the predetermined pressure, the control unit 55 stops driving the pump 14 (YES in step ST25). At this time, as indicated by the two-dot chain line in FIG. 4, the pressing cuff 71 and the tensile cuff 74 are sufficiently inflated, and the inflated pressing cuff 71 presses the back plate 72. Additionally, the tensile cuff 74 presses against the curler 5 in a direction away from the wrist 200, and then the belt 4, the curler 5, and the device main body 3 move in a direction away from the wrist 200, and as a result, the pressing cuff 71, the back plate 72, and the sensing cuff 73 are pulled toward the wrist 200 side. In addition, when the belt 4, the curler 5, and the device main body 3 move in the direction away from the wrist 200 due to the inflation of the tensile cuff 74, the belt 4 and the curler 5 move toward both lateral sides of the wrist 200, and the belt 4, the curler 5, and the device main body 3 move in a state of close contact with both lateral sides of the wrist 200. Thus, the belt 4 and the curler 5, which are in close contact with the skin of the wrist 200, pull the skin on both lateral sides of the wrist 200 toward the hand back side. Note that the curler 5 may be configured to indirectly contact the skin of the wrist 200 with the sheet members 86 or 106 in between, for example, as long as the curler 5 can pull the skin of the wrist 200.

Further, the sensing cuff 73 is inflated by being fed with a predetermined amount of air such that the internal pressure equals the pressure required to measure blood pressure, and is pressed toward the wrist 200 by the back plate 72 that is pressed by the pressing cuff 71. Thus, the sensing cuff 73 presses the artery 210 in the wrist 200 and occludes the artery 210 as illustrated in FIG. 26.

Additionally, the control unit 55, for example, controls the third on-off valve 16C and repeats the opening and closing of the third on-off valve 16C, or adjusts the degree of opening of the third on-off valve 16C to pressurize the pressure of the internal space of the pressing cuff 71. In the process of pressurization, based on the electrical signal output by the second pressure sensor 17B, the control unit 55 obtains measurement results such as blood pressure values, for example, the systolic blood pressure and the diastolic blood pressure, and the heart rate and the like (step ST26). The control unit 55 outputs an image signal corresponding to the obtained measurement results to the display unit 12, and displays the measurement results on the display unit 12 (step ST27). In addition, after the end of the blood pressure measurement, the control unit 55 opens the first on-off valve 16A, the second on-off valve 16B, the third on-off valve 16C, and the fourth on-off valve 16D.

The display unit 12 receives the image signal, and then displays the measurement results on the screen. The user views the display unit 12 to confirm the measurement results. After the measurement is complete, the user removes the prong 61*f* from the small hole 62*a*, and removes the second belt 62 from the frame body 61*e*. As a result, in the curler 5, the long-hand 5*h* is separated from the wrist 200 by a restoring force. Next, the user pulls out the wrist 200 from the curler 5 to remove the blood pressure measurement device 1 from the wrist 200.

The blood pressure measurement device 1 according to one embodiment configured in this manner has the end portion on the short-hand 5*g* side from the cover portion 5*a* of the curler 5, that is, the end portion located on the hand back side of the wrist 200 separated from the end portion on the long-hand 5*h* side from the cover portion 5*a*, that is, the end portion located on the hand palm side of the wrist 200. As a result, when the blood pressure measurement device 1 is attached to the wrist 200 smaller than the inner peripheral surface shape of the curler 5, to bring the curler 5 into close contact with the wrist, the end portion on the short-hand 5*g* side and the end portion on the long-hand 5*h* side of the curler 5 are movable in the direction close to each other without the interference. In addition, the clearance between both end portions of the curler 5 allows increasing the opening shape of the curler, compared with a configuration in which a clearance is not provided between both end portions of the curler 5, and an operation of expanding the curler 5 from between the end portion on the short-hand side and the end portion on the long-hand side of the curler 5 becomes easy. This facilitates inserting the wrist into the curler 5 when the wrist is inserted into the curler 5. As a result, the blood pressure measurement device 1 improves wearability.

Additionally, the curvature of the end portion on the short-hand 5g side of the curler 5 is set to smaller than the curvature of the end portion on the long-hand 5h side. Therefore, in a case where the amount of deformation of the curler 5 in the direction toward the wrist 200 increases, for example, as in a case where the blood pressure measurement device 1 is attached to the comparatively slim wrist 200 smaller than the inner peripheral surface shape of the curler 5, the end portion on the long-hand 5h side of the curler 5 is disposed inside the end portion on the short-hand 5g side of the curler 5. This allows suppressing the interference to the end portion on the short-hand 5g side by the end portion on the long-hand 5h side. Accordingly, even when the blood pressure measurement device 1 is attached to the wrist 200 smaller than the inner peripheral surface shape of the curler 5, the curler 5 can be deformed following the shape in the circumferential direction of the wrist 200. This allows the blood pressure measurement device 1 to suitably bring the curler 5 into close contact with the wrist 200.

Furthermore, the curler 5 has the end portion on the short-hand 5g side disposed outward in the width direction of the wrist 200 than the end portion on the long-hand 5h side. Thus, since the end portion on the short-hand 5g side of the curler 5 is disposed outward in the width direction of the wrist 200 than the end portion on the long-hand 5h side, the dimension from the cover portion 5a to the end portion on the short-hand 5g side in the width direction of the wrist 200 is greater than the dimension from the cover portion 5a to the end portion on the long-hand 5h side in the width direction of the wrist 200.

In addition, since the curvature of the end portion on the short-hand 5g side is smaller than the curvature of the end portion on the long-hand 5h side, the end portion on the short-hand 5g side has a shape overlapping with the end portion on the long-hand 5h side. Thus, when the curler 5 deforms toward the wrist 200, the end portion on the long-hand 5h side is movable toward the inside of the end portion on the short-hand 5g side, so the end portion on the long-hand 5h side does not interfere with the end portion on the short-hand 5g side.

As a result, the blood pressure measurement device 1 can reduce the inner shape of the curler 5 until the end portion on the long-hand 5h side abuts on the tensile cuff 74 in the contracted state, making it possible to bring the curler 5 into close contact with the further slim wrist 200. In particular, while the sensing cuff 73 is provided on the inner peripheral surface on the long-hand 5h side, the interference between the end portion on the short-hand 5g side and the end portion on the long-hand 5h side can be thus suppressed, and thus the end portion on the short-hand 5g side does not interfere with the sensing cuff 73. As a result, the sensing cuff 73 can be brought into close contact with the wrist 200, thereby ensuring the suitable blood pressure measurement by the blood pressure measurement device 1.

Even when the tensile cuff 74 including the plurality of air bags 101 where the thickness becomes thick is provided on the short-hand side, the end portion on the long-hand 5h side moves inside the end portion on the short-hand 5g side, and the curvature of the long-hand 5h side is greater than that of the short-hand 5g side. This allows suppressing the interference of the end portion on the long-hand 5h side to the tensile cuff 74 when the curler 5 is deformed in the direction in which the sensing cuff 73 is in close contact with the wrist 200.

The blood pressure measurement device 1 includes the first belt 61 provided on the first side in the circumferential direction of the wrist 200 of the device main body 3 and the second belt 62 provided on the second side in the circumferential direction of the wrist 200 of the device main body 3, and the first belt 61 and the second belt 62 are connected with the buckle 61b. Thus, tightening the curler 5 in which the wrist 200 is disposed with the first belt 61 and the second belt 62 allows pressing the curler 5 toward the wrist 200, making it possible for the curler 5 to follow the shape of the wrist 200 with simple configuration and operation. Additionally, when the wrist 200 is inserted into the curler 5, the end portion of on the long-hand 5h side of the curler 5 to be separated only needs to be pressed in the direction in which the long-hand 5h is separated from the short-hand 5g. Thus, when the long-hand 5h is pressed so as to be separated from the short-hand 5g, the long-hand 5h deforms in a direction in which the inner peripheral surface shape increases in size with the cover portion 5a of the curler 5 or a part of the long-hand 5h located on the lateral side of the wrist 200 as a base point. Thus, the wrist 200 can be easily attached into the curler 5, thereby ensuring facilitating the attachment of the blood pressure measurement device 1.

The blood pressure measurement device 1 has a configuration in which the power feed unit 8 is provided in the short-hand 5g, which has the end portion with the curvature smaller than that of the end portion on the long-hand 5h side. This configuration facilitates a task of providing the power feed unit 8, for example, when a FPC constituting the wiring portion 8a and the power feed terminals 8b of the power feed unit 8 is stuck to the recess 5c. Similarly, in a case where a connector is connected to the power feed unit 8, the connector only needs to be a connector into which the short-hand 5g with the comparatively small curvature is interposed, thereby facilitating the connector connection to the power feed unit 8.

As described above, the blood pressure measurement device 1 according to the present embodiment allows improving wearability and allows suitably bringing the sensing cuff into close contact with the wrist 200.

Note that the present invention is not limited to the embodiments described above. For example, the tensile cuff 74 is not limited to the configuration described above. For example, as illustrated in FIG. 27, the tensile cuff 74 may be configured such that the end portions on the end portion side of the short-hand 5g of the curler 5 of the plurality of air bags 101 are located on the cover portion 5a side with respect to the end portion on the short-hand 5g side in the extension direction of the curler 5 gradually from the air bag 101 on the curler 5 side to the air bag 101 on the wrist 200 side of the plurality of air bags 101. As illustrated in FIG. 27, for example, the tensile cuff 74 only needs to be configured such that the widths in the extension direction of the curler 5 of the plurality of air bags 101, that is, the long-hand widths of the air bags 101 gradually decrease from the curler 5 side toward the wrist 200 side. With such a tensile cuff 74, when the tensile cuff 74 is provided in the curler 5, the end portions of the plurality of air bags 101 in the tensile cuff 74 are located on the cover portion 5a side as heading from the curler 5 to the wrist 200. Thus, when the end portion on the long-hand 5*h* side moves toward the end portion on the short-hand 5*g* side, the interference to the tensile cuff 74 by the end portion on the long-hand 5*h* side can be further suppressed.

That is, the present invention is not limited to the embodiments, and various modifications can be made in an implementation stage without departing from the gist. Furthermore, each of the embodiments may be combined as appropriate to obtain the combined effects of the embodiments. Also, the embodiments described above include various stages of invention, and various inventions may be obtained by appropriately combining the multiple configuration requirements disclosed.

REFERENCE SIGNS LIST

1 Blood pressure measurement device
3 Device main body
4 Belt
5 Curler
5*a* Cover portion
5*b* Relief portion
5*c* Recess
5*d* Insert member
5*e* Screw hole
5*f* Hole portion
5*f*1 First hole portion
5*f*2 Second hole portion
5*f*3 Third hole portion
5*g* Short-hand
5*h* Long-hand
6 Cuff structure
7 Fluid circuit
7*a* First flow path
7*b* Second flow path
7*c* Third flow path
7*d* Fourth flow path
8 Power feed unit
8*a* Wiring portion
8*b* Power feed terminal
8*c* Cover
11 Case
12 Display unit
13 Operation unit
14 Pump
15 Flow path unit
16 On-off valve
16A First on-off valve
16B Second on-off valve
16C Third on-off valve
16D Fourth on-off valve
17 Pressure sensor
17A First pressure sensor
17B Second pressure sensor
18 Power supply unit
19 Vibration motor
20 Control substrate
31 Outer case
31*a* Lug
31*b* Spring rod
32 Windshield
33 Base
35 Back cover
35*a* First fastening member
35*b* Second fastening member
35*c* Hole portion
35*d* Hole portion
36 Sealing member
41 Button
42 Sensor
43 Touch panel
51 Substrate
52 Acceleration sensor
53 Communication unit
54 Storage unit
55 Control unit
56 Main CPU
57 Sub-CPU
61 First belt
61*a* Belt portion
61*b* Buckle
61*c* First hole portion
61*d* Second hole portion
61*e* Frame body
61*f* Prong
62 Second belt
62*a* Small hole
62*b* Third hole portion
71 Pressing cuff
72 Back plate
72*a* Groove
73 Sensing cuff
74 Tensile cuff
75 Bonding layer
81 Air bag (bag-like structure)
81*a* Welded portion
81*b* Bridge welded portion
82 Joined portion
83 Flow path body
83*a* Welded portion
84 Connection portion
86 Sheet member
86*a* First sheet member
86*b* Second sheet member
86*b*1 Opening
86*c* Third sheet member
86*c*1 Opening
86*d* Fourth sheet member
86*d*1 Hole portion
91 Air bag (bag-like structure)
91*a* Welded portion
91*b* Bonding margin
92 Flow path body
92*a* Welded portion
93 Connection unit
96 Sheet member
96*a* Fifth sheet member
96*b* Sixth sheet member
96*b*1 Hole portion
101 Air bag (bag-like structure)
101*a* Welded portion
101*b* Bridge welded portion
102 Joined portion
102*a* Relief portion
103 Connection portion
104 Notch portion
106 Sheet member
106*a* Seventh sheet member
106*b* Eighth sheet member
106*b*1 Opening
106*c* Ninth sheet member
106*c*1 Opening
106*d* Tenth sheet member
106*d*1 Opening 106e Eleventh sheet member
106e1 Opening
106f Twelfth sheet member
106f1 Opening
106g Thirteenth sheet member
106g1 Opening
106h Fourteenth sheet member
106h1 Opening
106i Fifteenth sheet member
106i1 Opening
106j Sixteenth sheet member
106j1 Opening
106k Seventeenth sheet member
106k1 Opening
106l Eighteenth sheet member
106l1 Hole portion
111 First outer layer
112 First intermediate layer
113 Second intermediate layer
114 Second outer layer
200 Wrist
210 Artery

The invention claimed is:

1. A blood pressure measurement device for attachment to a wrist, the blood pressure measurement device comprising:
a device main body that stores a pump and a pressure sensor;
a curler that curves to follow a circumferential direction of the wrist from a hand back side of the wrist to a region where at least one artery is present on a hand palm side of the wrist through a first lateral side of the wrist, the curler including a cover portion that fixes the device main body to the hand back side of the wrist, a long-hand side that extends from a first side of the device main body, and a short-hand side that extends from a second side of the device main body that is opposite to the first side, the curler having a curvature of an end portion of the short-hand side distant from the cover portion set smaller than a curvature of an end portion of the long-hand side distant from the cover portion, the end portion on the short-hand side being separated from the end portion on the long-hand side;
a sensing cuff provided on the long-hand side of the curler and on an inner circumferential surface on the hand palm side of the wrist, the sensing cuff being fluidly connected to the pump and the pressure sensor;
a tensile cuff that includes a plurality of bag-like structures provided on an inner circumferential surface on the hand back side of the wrist of the curler; and
a pressing cuff provided on an inner circumferential surface on the hand palm side of the wrist of the curler, the sensing cuff being provided on a wrist side of the pressing cuff, wherein
the end portion on the long-hand side is configured to extend along the first lateral side of the wrist, which is between the hand back side and the hand palm side, to the region where the at least one artery is present on the hand palm side of the wrist, and
the end portion on the short-hand side is configured to extend along a second lateral side of the wrist, which is between the hand back side and the hand palm side, opposite to the first lateral side.

2. The blood pressure measurement device according to claim 1, wherein
the curler has the end portion on the short-hand side disposed outward in a width direction of the wrist with respect to the end portion on the long-hand side.

3. The blood pressure measurement device according to claim 1, further comprising
a belt that cover the curler, the belt including a first belt provided on a first side in the circumferential direction of the wrist of the device main body, a second belt provided on a second side in the circumferential direction of the wrist of the device main body, and a connection tool that connects the first belt and the second belt.

4. The blood pressure measurement device according to claim 1, further comprising
a power feed terminal provided on an outer surface adjacent to the short-hand side of the curler.

5. The blood pressure measurement device according to claim 1, wherein
one of the plurality of bag-like structures at a cover portion side of the tensile cuff is longer in a direction along to the circumferential direction of the wrist than another of the plurality of bag-like structures at a wrist side of the tensile cuff.

* * * * *